(12) United States Patent
Loukus et al.

(10) Patent No.: US 11,306,872 B2
(45) Date of Patent: Apr. 19, 2022

(54) CORE STRUCTURED COMPONENTS, CONTAINERS, AND METHODS OF CASTING

(71) Applicant: Loukus Technologies, Inc., Calumet, MI (US)

(72) Inventors: Adam R. Loukus, Calumet, MI (US); Josh E. Loukus, Calumet, MI (US); Roy H. Loukus, Calumet, MI (US); Travis Pennala, Lyon, MI (US); Luke Luskin, Hubbell, MI (US); Steven J. Benda, Cokato, MN (US)

(73) Assignee: LOUKUS TECHNOLOGIES, INC., Calumet, MI (US)

( * ) Notice: Subject to any disclaimer, the term of this patent is extended or adjusted under 35 U.S.C. 154(b) by 0 days.

(21) Appl. No.: 16/563,865

(22) Filed: Sep. 7, 2019

(65) Prior Publication Data

US 2020/0018442 A1 Jan. 16, 2020

Related U.S. Application Data

(63) Continuation-in-part of application No. 14/176,093, filed on Feb. 8, 2014, now abandoned.
(Continued)

(51) Int. Cl.
*B65D 1/24* (2006.01)
*F17C 11/00* (2006.01)
(Continued)

(52) U.S. Cl.
CPC ............. *F17C 11/007* (2013.01); *B22D 19/02* (2013.01); *B29C 39/10* (2013.01); *B65D 1/24* (2013.01);
(Continued)

(58) Field of Classification Search
CPC .. B65D 1/24; B65D 1/36; B65D 25/04; F17C 2201/0171; F17C 2201/0161;
(Continued)

(56) References Cited

U.S. PATENT DOCUMENTS 3,338,238 A * 8/1967 Warncke ................. B63C 11/22
128/205.12
3,680,275 A * 8/1972 Romlet .................... E04H 7/18
52/223.7
(Continued)

*Primary Examiner* — Robert Poon
(74) *Attorney, Agent, or Firm* — Device Patent LLC

(57) ABSTRACT

A structural component having an internal support structure extending between outer wall portions of the component with one or more compartments included within the support structure. The support structure has support members including internal walls positioned between and/or defined by the compartments. At least one support member connects between the outer wall portions of the component to enhance the structural integrity of the component. The structural component, including the internal support, are cast from a molten material, and in some cases the support members of the internal support structure are formed with a rectilinear configuration. In some cases the cast structural component is a container and the one or more compartments are configured to store a fluid, such as a gas or a liquid. One or more preforms can be used to form a container and may be retained or eliminated from the container after casting.

20 Claims, 15 Drawing Sheets

Related U.S. Application Data

(60) Provisional application No. 61/801,233, filed on Mar. 15, 2013, provisional application No. 61/850,087, filed on Feb. 8, 2013.

(51) Int. Cl.
  B22D 19/02 (2006.01)
  B29C 39/10 (2006.01)
  B29L 31/00 (2006.01)

(52) U.S. Cl.
  CPC . *B29L 2031/712* (2013.01); *F17C 2201/0166* (2013.01); *F17C 2201/0171* (2013.01); *F17C 2209/2109* (2013.01); *F17C 2221/033* (2013.01); *F17C 2223/0123* (2013.01)

(58) Field of Classification Search
  CPC ...... F17C 2201/0166; F17C 2201/0157; F17C 2201/018; F17C 2201/0185; F17C 2209/221; F17C 2209/2118; F17C 2209/2109
  USPC ....... 220/501, 555, 554, 581, 516, 564, 500, 220/507, 527–529, 553, 675, 563; 206/0.6
  See application file for complete search history.

(56) References Cited

U.S. PATENT DOCUMENTS

| | | | | |
|---|---|---|---|---|
| 4,023,617 | A * | 5/1977 | Carlson | B65D 90/06 165/169 |
| 4,143,193 | A * | 3/1979 | Rees | B29C 33/14 220/555 |
| 4,292,375 | A * | 9/1981 | Ko | B21D 26/055 428/593 |
| 5,651,474 | A * | 7/1997 | Callaghan | B29C 70/088 220/565 |
| 5,944,215 | A * | 8/1999 | Orlowski | F17C 1/16 220/501 |
| 6,668,561 | B1 * | 12/2003 | Sheu | F17C 1/16 62/45.1 |
| 2004/0188446 | A1 * | 9/2004 | Gulati | F17C 3/025 220/651 |
| 2005/0006394 | A1 * | 1/2005 | Fujihara | F17C 1/16 220/581 |
| 2007/0194051 | A1 * | 8/2007 | Bakken | F17C 1/08 222/173 |
| 2009/0050635 | A1 * | 2/2009 | Richards | F17C 1/14 220/584 |
| 2014/0224809 | A1 * | 8/2014 | Loukus | F17C 1/00 220/501 |
| 2016/0114952 | A1 * | 4/2016 | Abdi | B65D 85/70 220/561 |
| 2018/0202611 | A1 * | 7/2018 | Sassi | F17C 13/082 |

* cited by examiner

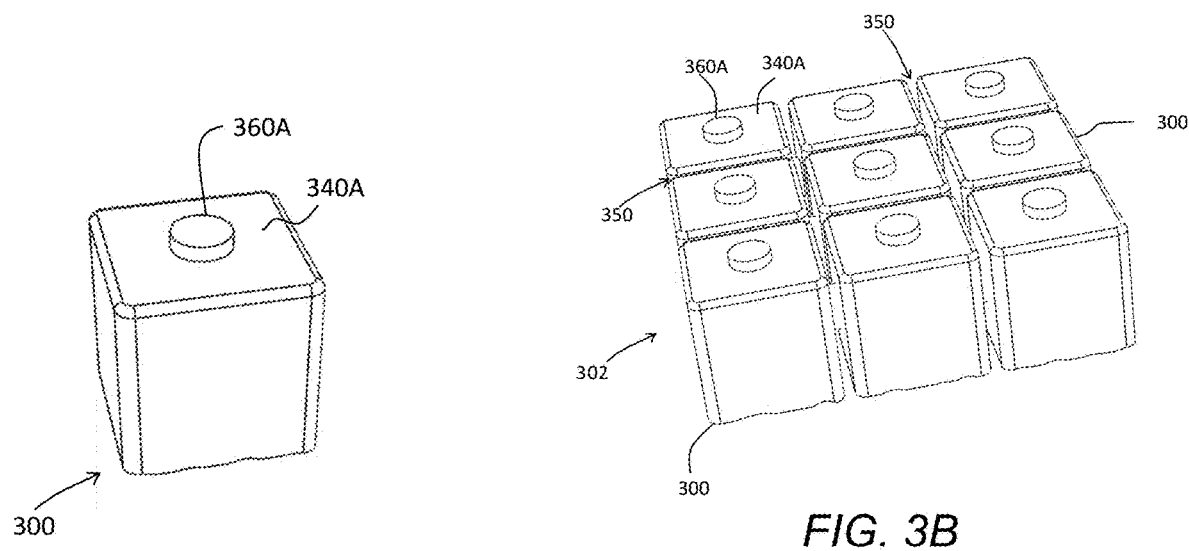
FIG. 3A
FIG. 3B
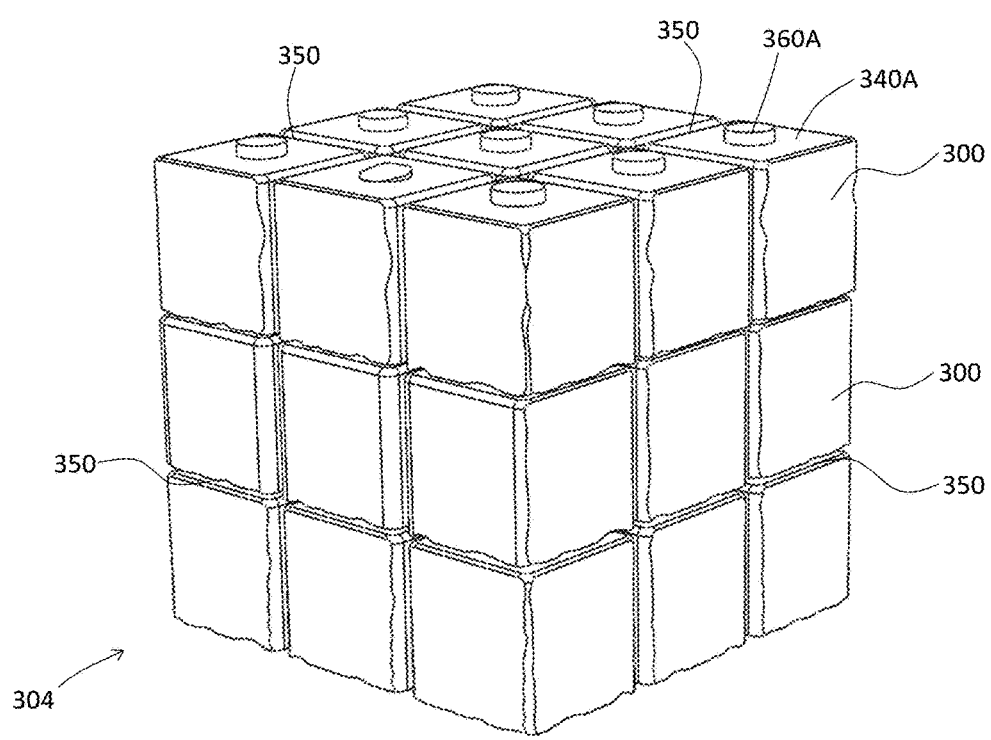
FIG. 3C

CORE STRUCTURED COMPONENTS, CONTAINERS, AND METHODS OF CASTING

CROSS-REFERENCES

This application is a continuation-in-part of U.S. patent application Ser. No. 14/176,093 filed on Feb. 8, 2014 which is a continuation-in-part of International Patent Application No. PCT/US2013/053877, filed Aug. 6, 2013, which claims the benefit of U.S. Provisional Patent Application No. 61/680,070 filed Aug. 6, 2012, and also claims the benefit of U.S. Provisional Patent Application No. 61/850,087 filed Feb. 8, 2013, and U.S. Provisional Patent Application No. 61/801,233 filed Mar. 15, 2013. The contents of each of the above-referenced applications are hereby incorporated herein by reference.

FIELD

This disclosure generally relates to casted articles and methods of casting, and more particularly relates to methods of using core structures to cast structural components with one or more cavities, including containers having one or more cavities.

BACKGROUND

In a general sense, a structural component can be any part that is designed to carry or bear some amount of load or weight. One type of a structural component is a containment vessel, also referred to herein more generically as a container or a tank. Containment vessels are used for storing many things, including for storing fluids such as liquids and gases. In many cases the contents of a tank will be pressurized to store a larger volume in the tank. As a simple well-known example, consumer-grade propane tanks are commonly sold storing a volume of propane gas under pressure that can be released by hand valve. Larger tanks for storing the fertilizer anhydrous ammonia are also well known. Aanhydrous ammonia must be stored at high pressure and/or low temperature in order to store it in liquid form. Thus, large commercial-grade tanks must be designed to withstand the pressure exerted on the tank walls by the compressed ammonia. Another example includes containment vessels designed for storing compressed natural gas under high pressure, which can be useful for transporting a large volume of gas in a smaller, portable vessel as in the case of vehicles that operate using compressed natural gas. Of course many other examples of containers and, more generally, structural components exist.

Accordingly, in the case of containment vessels, it can be useful to design the container to withstand greater pressures so that the containers can store larger volumes of gas under higher pressures without failing. More generally, it is also often desirable to simply increase the load bearing capacity of any type of structural component. One well-known method for increasing the load bearing capacity of a structural component is to incorporate geometric curves or arcs into the design of the component. Typical foam materials having a cell structure incorporating spherically-shaped voids provide one example of such a structural component. Cylindrical gas tanks provide another example of a component incorporating a curved design. As is known, the cylindrical geometry of the tank wall more evenly distributes the load exerted by the pressurized gas inside the tank.

It will also be appreciated that load bearing capacity can be increased by simply reinforcing existing support structures. For example, cylindrical tanks generally have thick walls to provide the high tensile and rupture strengths that prevent container burst and loss of tank contents.

Casting is one well-known process that has been used to manufacture a variety of structural components. Those skilled in the art will appreciate that other manufacturing techniques and processes are also employed to make structural components.

SUMMARY

Embodiments of the invention are generally directed to structural components that can bear some amount of a load. In some cases, embodiments provide structural components in the form of various containers that are capable of withstanding pressure exerted on the wall(s) of the container. Some embodiments provide new methods for casting structural components, including containers. In addition, some embodiments provide core structures and/or methods of making core structures that can be used to form cavities in the subsequent formation of a structural component such as a container.

According to one aspect, a structural component is provided. The component is cast from a molten material and includes first and second outer wall portions. An internal support structure extends between the first outer wall portion and the second outer wall portion. The structural component also includes a number of compartments positioned within the internal support structure. The internal support structure includes multiple rectilinear support members. Each of the rectilinear support members includes a solidified material formed by a corresponding molten material flow path. The flow path for the molten material is provided by a core structure used to cast the structural component. Further, at least one of the rectilinear support members is connected between the first outer wall portion and the second outer wall portion, which enhances the structural integrity of the component. In one embodiment the rectilinear support members include multiple internal walls that are defined by the compartments and/or that define the compartments.

Some embodiments provide a container that is cast from a molten material. In some cases the container includes an internal support structure extending between outer wall portions of the container. The support structure includes multiple internal walls that define and/or are defined by multiple compartments within the container. The support structure is formed by a molten material received within one or more flow paths of a casting insert configured for forming the container. In preferred embodiments, each intersection of the support member and external wall is a solidified casted junction as opposed to an assembled junction using for example fasteners.

According to some embodiments, the container includes multiple compartments, each of which has a configuration provided at least in part by a corresponding preform forming a part of a core structure used to cast the container. The container also has an internal support structure that includes multiple rectilinear support members. The rectilinear support members include internal walls that are at least partially defined by the compartments and/or that at least partially define the compartments in the container. The container also includes an external wall that substantially encloses the internal support structure and the compartments. The external wall has a first outer wall portion and a second outer wall portion. At least one of the rectilinear support members is connected between the first outer wall portion and the second outer wall portion to enhance the structural integrity of the container. Again, in preferred embodiments, each intersection of the rectilinear support members with one or more of a first outer wall portion and the second outer wall portion comprises a solidified casted junction.

According to some embodiments, a method for casting a structural component such as a container is provided. The method includes providing a mold having a cavity with multiple cavity walls and positioning a core structure in the mold. The core structure includes multiple preforms. The method also includes forming an external component wall by introducing molten material into an exterior flow path between one or more of the cavity walls and the core structure. The method further includes forming multiple compartments and a number of rectilinear support members by introducing the molten material into a number of interior flow paths extending between the preforms in the core structure. Forming the compartments in such a manner locates a compartment at a location of each of the preforms. The method also includes connecting the rectilinear support members between separate points on an internal surface of the external container wall and solidifying the molten material.

In some embodiments a method for forming a container includes positioning a core structure, also referred to herein more generally as a casting insert, within a mold cavity. The core structure/casting insert includes a preform with a barrier layer thereabout. A molten material is introduced into the mold cavity about the casting insert. The barrier layer prevents the molten material from infiltrating into the preform. The molten material is then solidified such that the preform defines one or more compartments as well as support structure within the solidified material. In some cases the support structure includes multiple rectilinear support members generally extending in straight lines through the container and between the formed compartments.

According to some embodiments, a casting insert is provided for forming a structural component such as a container. The casting insert, sometimes referred to as a core structure, has adjacent preforms, each having an external surface configured for preventing infiltration of molten material into the preforms. In some cases the external surface can be provided by an impermeable barrier layer positioned about the preform. In some embodiments one or more preforms may inherently provide an impermeable external surface based on the composition of the preform itself. The core structure/casting insert further includes one or more flow paths configured for receiving a molten material between adjacent preforms. The adjacent preforms are configured to form interconnected compartments within the container, with the compartments having a support structure extending between and at least partially defining the boundaries of the compartments.

Some embodiments may optionally provide some or all of the following advantages, or none at all, or other advantages not listed here. For example, in some cases the internal walls of a structural component may form a contiguous cavity within the structural component such that the contiguous cavity includes two or more of the previously mentioned compartments. Further, in some cases the internal walls provide at least one fluid flow path within the contiguous cavity that extends through the two or more compartments.

In some embodiments the compartments of a structural component are arranged in a geometric configuration corresponding to the locations of preforms that form at least part of a core structure used to cast the structural component. The compartments can in some cases have an approximately polyhedral shape (e.g., a generally cubic shape, an approximately rectangular shape, etc.) formed according to a corresponding shape of the preforms. In certain embodiments, some or all of the outer surfaces of a preform may have a generally planar configuration that meets adjacent, generally planar, surfaces along a generally linear edge. In some embodiments the edges of such preforms have a slightly curved, rounded, and/or beveled configuration that creates a corresponding compartment edge having a curved, rounded, and/or beveled configuration. Such edge configurations may aid in distributing and dispersing stress loads from a pressurized material within the compartment.

In some cases a first set of the compartments has a first size and a second set of the compartments has a second size larger than the first. In addition, in some cases this second set of compartments are positioned near a middle of the structural component and the first set of compartments are arranged between the second set of compartments and an external wall of the structural component. According to some embodiments an external wall of a structural component and/or container may have a cylindrical configuration, while in some embodiments the external wall may have a non-cylindrical configuration. For example, an external wall with a non-cylindrical surface contour may include multiple generally planar surfaces. The surface contour of the external wall corresponds to an arrangement of the first set of compartments.

In some cases the compartments are positioned adjacently within the internal support structure. The structural component can have tubes connecting or positioned between, and intersecting, adjacent compartments to provide a fluid flow path between the adjacent compartments.

In some cases at least one rectilinear support member is configured as a generally planar wall that extends along one side of a compartment. Rectilinear support members and the external wall can be integrally formed and include a solidified material. The external wall can also have a configuration corresponding to a molten material flow path created during casting between walls of a mold and an exterior of the core structure. In some cases, each rectilinear support member has a configuration corresponding to a molten material flow path within the core structure between adjacent preforms. The solidified material can be any one or combination of materials used in casting, including one or more of a metal, a metal matrix composite, a glass, an elastomer, a confection, a thermoplastic polymer, and a thermosetting polymer.

According to some embodiments, each of the compartments has a void formed in the container from removing part or all of each preform from within the core structure. In certain embodiments, one or more, or each/all of the compartments include at least a portion of its corresponding preform. In such cases the preform can be formed from a permeable storage material configured to store a fluid. For example, in some cases the storage material includes a graphite based fiber material configured to adsorb a fluid.

Methods for casting a structural component can also include retaining the preforms within the core structure after solidification, and optionally storing a fluid within a permeable storage material. In some cases a method also includes removing the preforms from within the core structure after solidification, thus configuring each compartment as a void in the container.

These and various other features and advantages will be apparent from a reading of the following detailed description.

BRIEF DESCRIPTION OF THE DRAWINGS

The following drawings illustrate some particular embodiments of the present invention and therefore do not limit the scope of the invention. The drawings are not to scale (unless so stated) and are intended for use in conjunction with the explanations in the following detailed description. Some embodiments will hereinafter be described in conjunction with the appended drawings, wherein like numerals denote like elements.

FIG. 3A is a perspective view of a preform according to some embodiments.

FIG. 3B is a perspective view of a layer of the preforms of FIG. 3A according to some embodiments.

FIG. 3C is a perspective view of a core structure with a stacked arrangement of multiple preforms as in FIG. 3A according to some embodiments.

DETAILED DESCRIPTION

The following detailed description is exemplary in nature and is not intended to limit the scope, applicability, or configuration of the invention in any way. Rather, the following description provides some practical illustrations for implementing some embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Various new embodiments of casted preforms, casted core structures, casted structural components (e.g., containers), methods for casting structural components, methods for casting preforms and/or core structures, and related features, techniques, and details are described below. As used herein, the term "structural component" refers broadly to a part or component that can bear a load. Accordingly, a structural component can generally be considered to have an interface that receives the load and some type of support structure that supports the interface while it receives the load. Examples of structural components are numerous and evident in virtually every aspect of man-made structures. As just a few examples, foam materials used for padding or shock absorption, crash pads installed on a median that absorb the impact of a wayward vehicle on a freeway, parts of such a vehicle designed to withstand impacts, armor plating, and ballistic armor (e.g., with void cavities filled with energy absorption gel) are all considered examples of structural components for purposes of this disclosure. In addition, various types of containers, including but not limited to containment and/or storage vessels, pressurized and non-pressurized tanks, and dry storage units are all examples of structural components. Of course a wide variety of other structural components are also contemplated although not mentioned herein.

As will be appreciated, embodiments described herein are directed to structural components that are at least in part cast by introducing a molten material into a mold and then letting the material solidify to form the desired component. Accordingly, discussion of structural components herein assumes that at least some portion of a component has been or will be casted unless otherwise specified. For example, new methods of casting various types of containers, as well as the casted containers themselves, are described herein. Further, while several embodiments are described with respect to container-type structural components, embodiments are not limited to containers. It is also contemplated that the teachings provided herein can be applied to various other types of structural components, including but not limited to any of the examples provided herein.

Figure 1:
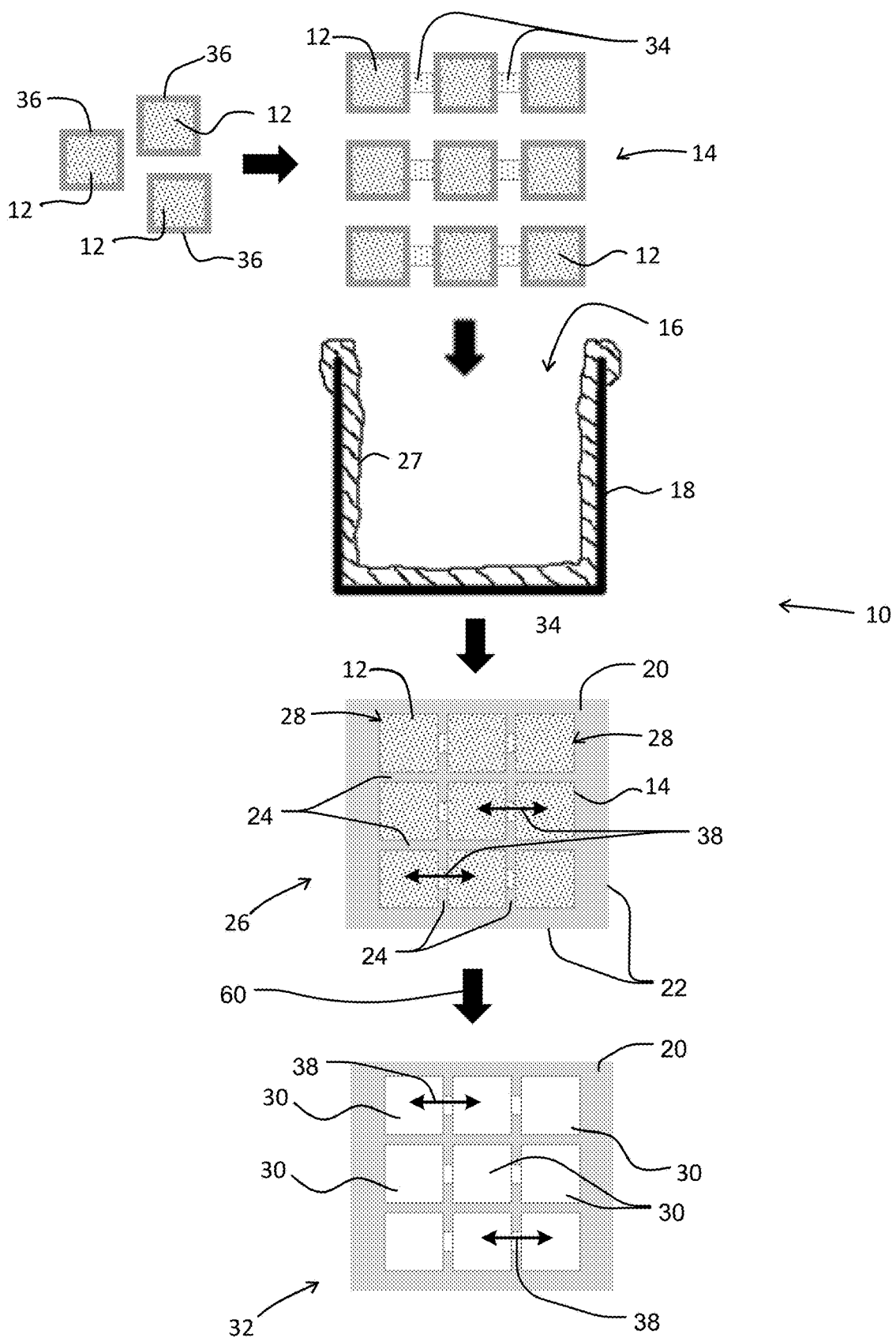
FIG. 1 is a flow diagram of a method of casting a container with a core structure according to some embodiments.

Turning to the drawings, FIG. 1 is a flow diagram of a method 10 that illustrates some steps in a process of casting a structural component according to some embodiments. In this case the structural component is a container, though it should be understood that a similar method can be used for casting other types of structural components.

FIG. 1 provides an overview of the method 10 for casting a container 26 and/or another container 32 according to some embodiments. As shown in FIG. 1, in this case multiple preforms 12 are arranged, and in some cases assembled, as a core structure 14. The term casting insert 14 is also used herein to refer to the core structure 14. As shown, the core structure/casting insert 14 may be formed from multiple preforms 12 and assemblies of preforms. In this example, the core structure 14 has an overall cubic shape (shown as a square in the two-dimensional drawings) corresponding to the overall shape of the combined preforms 12. Although not shown in FIG. 1, other shapes and configurations of preforms are contemplated for the core structure 14 depending upon, for example, the particular use or environment of the final core structure or container. Some other examples of possible core structure shapes are discussed later herein.

Returning to FIG. 1, after forming the core structure 14 with the preforms 12, the assembled/arranged core structure 14 is positioned within the cavity 16 of a mold 18. A molten material 20, such as a molten metal or a molten polymer, is then introduced into the cavity of the mold 18 about the core structure 14. As the molten material 20 fills the cavity but not the space occupied by the core structure 14, the material 20 forms an external container wall 22 and a number of support members 24 whose dimensions and shapes are determined by flow paths around and within the core structure 14. After the mold 18 is filled, the molten material 18 is allowed to solidify, thus forming the container 26.

In certain embodiments, the core structure 14 may be aligned within the mold cavity 18 so as to register the orientation of the core structure 14 with the surrounding mold cavity walls and/or other features, thus allowing for more precise formation of the corresponding structural component. In certain embodiments, one or more additional preforms may be positioned in the mold cavity to align the core structure as it is introduced. For example, in some cases one or more preforms having the same length and/or width as the mold cavity are positioned in the cavity between the cavity's walls, thus aligning the preform(s) with the cavity walls. The core structure can then be placed on top of the preform(s), thereby suspending the structure above the bottom surface of the mold. In some cases the preform may be formed from a sacrificial material and include one or more surface features to receive and orient the core structure. During the casting process, molten material may infiltrate the sacrificial preform, thus forming an integral cast structure (e.g., possibly including the preform) below the casting insert. Such a technique can be used, for example, to form the bottom wall of a container.

In some cases other methods may be used to align the core structure within the mold cavity. One example involving injection molding includes aligning a core structure relative to one or more sprue extending into the mold cavity. In some cases a feature of the finished component, such as a port or other discontinuity in the outer surface of the component, may serve as an alignment point.

According to some embodiments, a thermal insulation layer 27 may be used to insulate one or more portions of the mold cavity 16 and/or core structure 14. Examples of possible thermal insulators that can be used are described in U.S. patent application Ser. No. 13/840,423, filed Mar. 15, 2013, and titled Thermal Isolation for Casting Articles, and U.S. patent application Ser. No. 13/836,001, filed Mar. 15, 2013, and titled Thermal Isolation Spray for Casting Articles. Each of the above-referenced applications are hereby incorporated by reference herein in their entirety. As described in more detail in application Ser. Nos. 13/840,423 and 13/836,001, the thermal insulation layer 27 (sometimes provided in the form of a blanket or applied as a spray) can allow the molten material 20 to remain in a molten state for an extended dwell time. For example, using the thermal insulation layer 27 may extend the dwell time from the introduction of the molten material 20 at least until the mold cavity 16 is filled. In another example, the insulation layer 27 may extend the dwell time from first introduction of the molten material 20 until pressurization, such as in the case of squeeze casting.

Referring back to FIG. 1, the core structure 14 defines and locates a corresponding compartment 28 at the location of each preform 12. In some cases the preforms 12 may remain within the container 26. As one example, a preform may optionally be formed from a porous or permeable material that can receive and store a fluid. As shown in FIG. 1, in some embodiments an additional step 60 of the method 10 includes removing the preforms 12 and core structure 14, thus forming a container 32 with empty compartments 30 or voids 30. As will be discussed, in some cases preforms and core structures can be removed from the container by washing away or burning away the preform material.

According to some embodiments, arranging and/or assembling multiple preforms to form a core structure may optionally include providing a physical connection between the preforms and/or a fluid connection between two or more of the preforms. For example, FIG. 1 illustrates the preforms 12 being connected together with tubes 34 to form three layers of the core structure 14. Each layer can then be placed within the mold cavity 16 in conjunction with the molten material 20 to space apart the core structure layers. The tubes 34 can be hollow tubular members that physically and fluidly connect two or more adjacent preforms 12. Upon solidification, and optional removal of the preforms 12, the tubes 34 and the compartments 30 can thus provide one or more contiguous cavities having a fluid flow path 38 through portions of the cavities and container.

Although not shown in FIG. 1, in some embodiments the individual layers of the core structure 14 may also be connected using tubes 34, thus providing a single, integral core structure 14. Accordingly, it should be appreciated that many configurations for a core structure are possible, including single, integrated core structures in which all preforms are connected in some manner. In some embodiments such a configuration may optionally define a single contiguous cavity including multiple compartments 30 connected together with flow paths 38 extending between some or all of the compartments 30.

Continuing to refer to FIG. 1, some embodiments also make use of a barrier layer 36 that is applied as a coating about the preforms 12 and/or core structure 14. The barrier layer 36 provides a functional seal about each preform 12, thus preventing infiltration of the molten material within the preform during casting. While in some cases portions of the barrier layer may remain in the casted containers 26, 32, in some embodiments the barrier layer 36 may break apart or disintegrate when the molten material 20 comes into contact with the layer. This may occur, for example, during squeeze casting. As discussed elsewhere, in some cases a barrier layer may not be used or needed, such as in the case that the preform material is impermeable (e.g., formed from salt, sand, etc.).

Figure 2A:
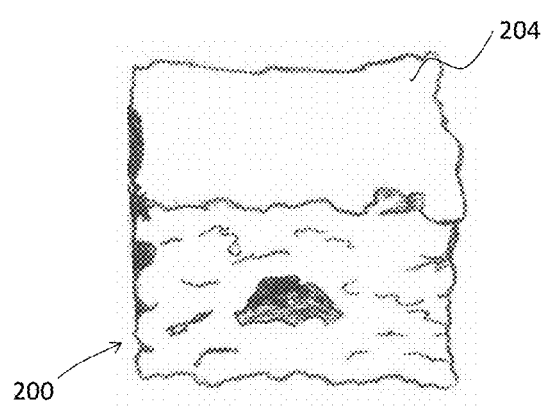
FIGS. 2A and 2B are perspective views of preforms with a barrier layer according to some embodiments.
Figure 2B:
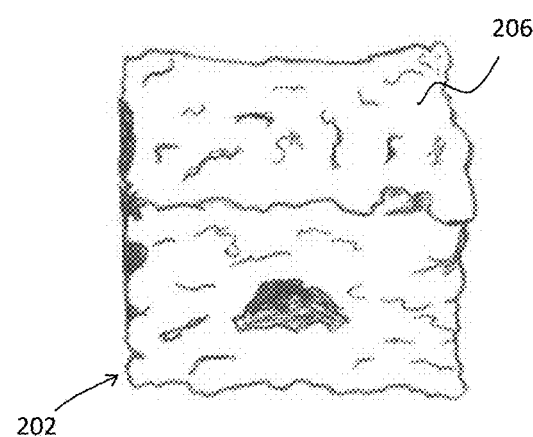

FIG. 2A-2D relate to some embodiments for casting a structural component such as a container using a network of two or more tube-mounted preforms. FIGS. 2A and 2B are perspective view of preforms 200, 202 coated with a barrier layer 204, 206, respectively, according to some embodiments. Preforms as used in various embodiments can be made from a variety of materials. Examples of materials and techniques for forming some suitable preforms are disclosed in U.S. Pat. No. 8,075,827, titled "Variable-Density Preforms", issued Dec. 13, 2011, the entirety of which is incorporated herein by reference. As just a few possible, but not exhaustive, examples, a preform such as the preforms 200, 202 shown in FIGS. 2A-2B can be formed from a composition including one or more of carbon graphite fibers, silicon carbide, SAFFIL®, and Nextel™ 610. In some cases a preform can be made from salt, sand, or any other suitable coring material.

According to some embodiments, the preforms 200, 202 can optionally be made from a material or composition that can be removed from a container after casting is complete. For example, a preform may be made from salt or sand. In some cases such a preform may be made using a three dimensional printing process in which salt, sand, and/or another suitable material is built up or etched away using a computer controlled printing machine. After surrounding such a preform with molten material, and allowing the molten material to solidify, the preform material may be removed to form open compartments within the solidified material.

In some cases preforms may dissolved (e.g., in the case of salt) and/or rinsed away (e.g., sand) with a fluid such as water through one or more fluid flow paths in the container. According to some embodiments, a preform can be formed from a material that can be disintegrated or eliminated by heating so as to define compartments that are empty. For example, in some cases a preform may have a composition including carbon or graphite fibers. After casting the container, the container and included preforms/core structure can be heated (e.g., fired) in an oxidizing environment so as to form carbon dioxide that can escape through one or more flow paths in the container.

In certain embodiments, one or more preforms can have a composition that is permeable and/or porous, thus enabling the preform or a portion of the preform to remain within the container after casting and optionally during use. In this situation compartments within the casted container may be formed simply by preforms displacing the molten material until solidification to create spaces within the container free of the molten material. Thus, the preforms may remain within the casted structural component and form part of the compartments within the casting. As just one possible example, preforms with sorbent capabilities can be used to form compartments within a pressurized gas tank such as a compressed natural gas (CNG) tank. In some cases a preform could be formed from a graphite-based fiber preform that adsorbs methane from compressed natural gas stored in a container.

According to some embodiments, preforms may also remain within a container or other structural component post-casting if the preforms add any other desired functionality to the compartments and/or structural component. In certain embodiments, for example, preforms may be left within a structural component for additional structural properties such as absorption of force as in the case of ballistic and other uses.

Referring back to FIGS. 2A and 2B, the preforms 200, 202 are approximately formed as cuboids, having a generally rectangular, three-dimensional shape. In general, embodiments may incorporate preforms having one of a variety of different shapes. Some possible examples are cubic shapes, rectangular shapes, pyramidal shapes, rhomboidal shapes, and other shapes. According to some embodiments, a preform may generally be defined as having an approximately polyhedral shape. For example, in some cases a preform can have multiple exterior generally planar surfaces that approximately correspond to the exterior surface planes of a particular polyhedron.

As shown in FIGS. 2A and 2B, the preforms 200, 202 have exterior surfaces that approximately correspond to the surfaces of a cube, although the preform surfaces are not precisely planar as with a cube's surfaces. In addition, the preform surfaces generally meet along an approximate straight line edge, though the edge may not be as perfectly straight as the edge of a mathematically defined polyhedron.

In another example, the edges of a preform may have a slightly curved, rounded, and/or beveled configuration, as shown in FIGS. 2C, 2D, 3A, 3B, FIGS. 5A-5e, and FIGS. 7A-7B. As used herein, the terms "generally polyhedral" and/or "approximately polyhedral" include such embodiments.

In some cases providing preforms in a generally polyhedral shape such as a cuboid or rhomboid can increase the compartment or void density within a structural component such as a container. For example, the shape of the preform may be chosen to maximize void density approaching 100%. These types of preform configurations can thus provide an advantage over cylindrical and/or spherical shapes, which inherently have lower density arrangements, since a greater void density provides a larger volume for storing fluids and less material leading to less weight.

Figure 2C:
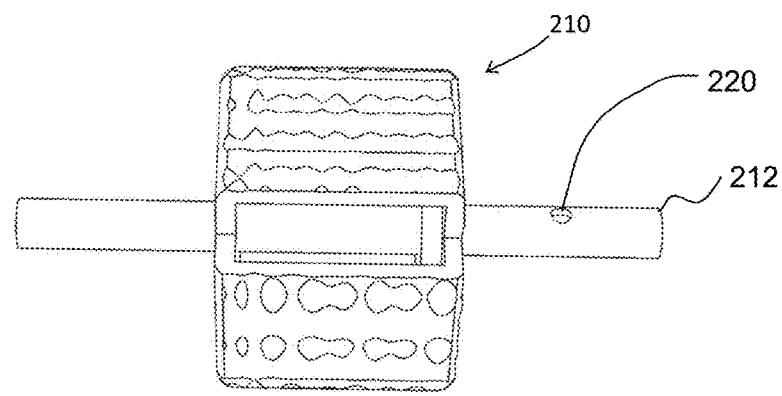
FIG. 2C is a perspective view of a preform with a connecting tube according to some embodiments.
Figure 2D:
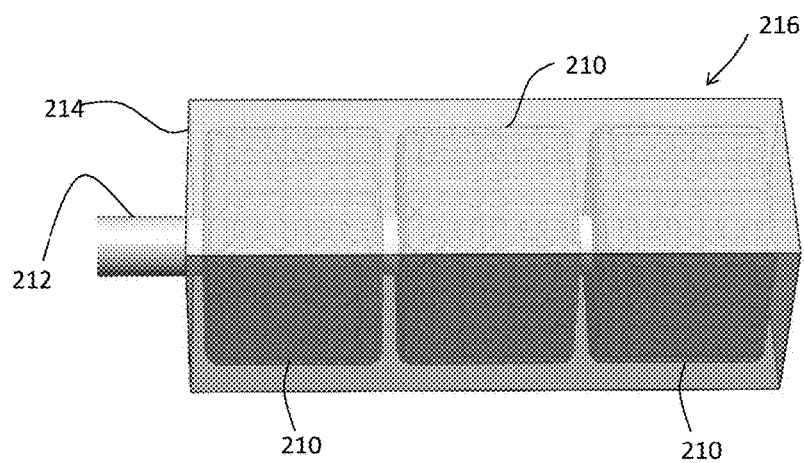
FIG. 2D is a perspective view of a row of preforms and a connecting tube cast within a translucent material according to some embodiments.

FIG. 2D is a perspective view of a row of preforms 210 and a connecting tube 212 cast within a translucent material 214 according to some embodiments. As shown in FIG. 2D and elsewhere, in several embodiments it is contemplated that two or more preforms can be connected or arranged (e.g., stacked) together to form a network or system of preforms. Such an arrangement of preforms is also referred to as a casting insert or a core structure herein since the preforms are inserted into the mold during the casting process and are used to form one or more compartments at the core of the structural component.

FIG. 2D illustrates how the preforms 210 are arranged and connected to form a core structure 216. The preforms 210 are connected to one another in a spaced-apart relationship by the connecting tube 212, which in this case also provides an inter-compartmental flow path extending between preforms 210 and ultimately between compartments formed in the casted container. As such, interconnected preforms 210 also define interconnected compartments within a container. In some embodiments, inter-compartmental flow paths are conduits or ducts configured for fluid communication between interconnected compartments.

In certain embodiments, support tubes 212 can include an impermeable external surface for preventing infiltration of the molten material into the support tube 212 and corresponding flow path. For example, the support tube 212 can be formed from a hollow rod for connecting adjacent preforms to one another. FIG. 2C illustrates one example of a support tube/rod 212 extending through the preform 210. In some cases rods such as rod 212 include fill and egress holes 220, and extend through a network of preforms, thus forming a lattice-type structure of rods. (See, for example, FIG. 6.) In some cases the rods may be coated with a barrier layer or be otherwise impermeable. After forming such a container and removing the preforms (or maintaining the preforms), the rods may be left within the container, connecting adjacent compartments such that the fill and egress holes 220 within the network of rods/tubes provide a desired inter-compartmental flow path between compartments within the container.

While FIGS. 2C and 2D illustrate a single preform 210 and a series of three preforms 210, with a support tube 212 extending through the preforms, this should not be considered as a limitation of any sort. In some embodiments, one, two, or more preforms can be placed in a spaced-apart relationship along one single tube/rod so as to define one or more flow paths between adjacent preforms. Two or more preforms positioned adjacent one another on a single rod can be considered as pieces arranged on a skewer and/or arranged as sheesh-kebob.

In certain embodiments, the tubes may be removed during or after casting, though in some cases the tubes can remain within the preform(s) to increase the strength of the final casted product. In some embodiments in which the tubes are not impervious, the external surface of the tubes can be coated with an impermeable barrier so as to prevent the infiltration of the molten material into the tube and thereby hinder fluid communications between interconnected compartments.

Further, in certain embodiments, only adjacent preforms may be connected to one another with one single bar extending between opposed sides of the adjacent preforms 24. In some embodiments, inter-compartmental flow paths are defined by an elongated hollow conduit, e.g., a tubing. In some embodiments, the conduit may have an impermeable exterior surface. In certain embodiments, the conduit may have openings 220 through its external surface so as to facilitate fluid communications between the hollow of the conduit and the preform through which it extends. The ends of the conduit may be open or closed.

Returning to FIGS. 2A and 2B, in certain cases, preforms may have a porosity that ranges from being impervious to being highly porous depending upon the type of material used. In cases in which preforms exhibit some degree of porosity, a barrier layer such as the barrier layer 204 or 206 can be applied to the external surfaces of a preform so as to prevent or minimize the infiltration of the molten material into the preforms. The barrier layer may not be needed if a preform is impermeable.

In some embodiments, the barrier layer can be applied prior to and/or after assembling preforms 200, 202 into the casting insert shown in FIG. 2D. For instance, in some cases the barrier layer application process can be an integral part of the process for manufacturing the preforms. In certain embodiments, the barrier layer can be applied after manufacturing the preforms and prior to assembling them into a core structure or casting insert. In some embodiments, the barrier layer can be applied after preforms have been assembled into a core structure. In certain embodiments, casting inserts and/or preforms may additionally be sintered after the barrier layer has been applied. Firing the preforms/insert to sinter can in some cases be useful for pressurized casting methods, such as squeeze casting, but may not necessarily be needed or desired for low pressure casting methods such as gravity casting or other low pressure methods.

In some embodiments, the barrier layer can be sprayed onto the preforms or can be formed by submerging the preforms in a bath or a vat containing a liquid or a slurry of the barrier layer material. In certain embodiments, the density and/or porosity of the barrier layer can be varied along the direction of its thickness extending away from the external surfaces of the preforms. For instance, in some embodiments, the density and/or porosity of the barrier layer can increase or decrease with distance extending away from the external surfaces of preforms. In some embodiments, a first density of the barrier layer at a first location near or with an external surface of preform can be different from a second density of the barrier layer at a second location spaced apart from the first location. In certain embodiments, a first porosity of the barrier layer at a first location near the preform's external surface can be different from a second porosity of the barrier layer at a second location away from the first location. In a non-limiting exemplary embodiment, the first porosity can be substantially less than the second porosity. In other words, the barrier layer can be relatively more impervious at the first location nearer the preform than at the second location farther from the preform. As such, in some cases at least a portion of the molten material introduced about preform can be permitted to infiltrate at least some distance into the barrier layer.

FIGS. 3A-3C depict another embodiment of preforms 300 for forming a core structure. FIG. 3A is a perspective view of a single preform 300 according to some embodiments, while FIG. 3B is a perspective view of a layer 302 of the preforms 300. FIG. 3C is a perspective view of a core structure 304 with a stacked arrangement of multiple preforms 300.

As will be apparent, in the depicted embodiment, core structure 304 is formed by interconnecting the preforms 300 using protrusions 360 and corresponding holes, in a manner similar to that used with Lego™ brand building blocks. As is shown, adjacent preforms 300 define a pair of opposing external surfaces with a flow path extending therebetween. In some embodiments, one such external surface 340A includes at least one protrusion 360A configured to be received by and retained within a corresponding complementary recess or hole on an opposite side of an adjacent preform. Accordingly, the preforms are interconnected to one another by inserting the protrusions 360 into the recesses of the adjacent preform. The other preforms are interconnected in a similar manner. As will be apparent, a plurality of preforms can be interconnected to form a three-dimensional core structure 304. Once the preforms 300 have been assembled to form core structure 304, the preforms and protrusions can optionally be eliminated after applying a barrier layer. The remaining barrier layer thus defines the external walls of the preforms, thus defining or forming compartments within a container and inter-compartmental flow paths between adjacent compartments.

As used with respect to FIGS. 3A-3C, the term "casting insert" refers to an arrangement of multiple preforms that are spaced apart from one another so as to define one or more molten material flow paths 350. In this example, the term casting insert refers to the entire or whole structure of connected preforms, though in other examples a casting insert may be provided in a variety of sizes and configurations of one, two, or more preforms or other sub-inserts that are joined together and/or separately positioned within a mold cavity during casting.

It should be appreciated that a wide variety of core structures and casting inserts are contemplated according to the teachings provided herein. The arrangement and/or assembly of multiple smaller preforms provides nearly an infinite variety of possible shapes, sizes, and configurations of core structures that can then be used to cast a corresponding infinite number of components, including containers. Several examples of possible core structures and corresponding casted components and containers will now be described with reference to the figures. Even so, it should be appreciated that many other examples are possible in embodiments not described herein.

Figure 4A:
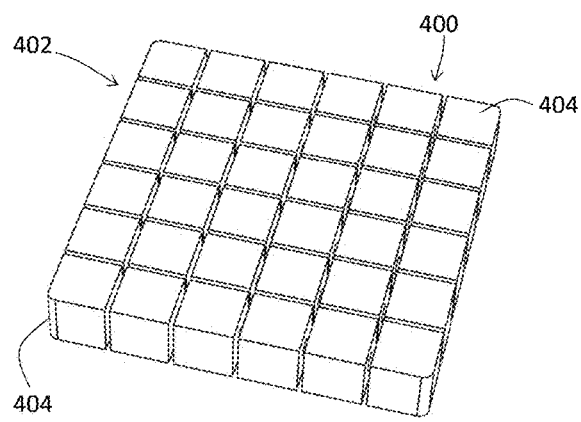
FIG. 4A is a perspective view of a core structure with a layer of preforms according to some embodiments.
Figure 4B:
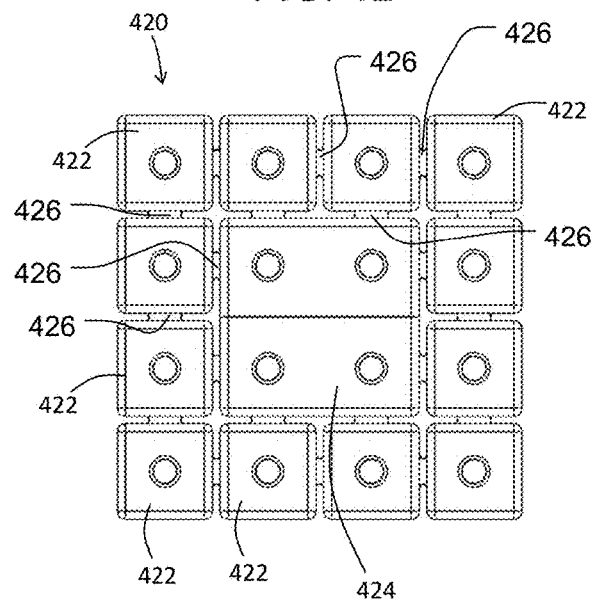
FIG. 4B is a top view of a core structure with an arrangement of preforms of different sizes according to some embodiments.
Figure 4C:
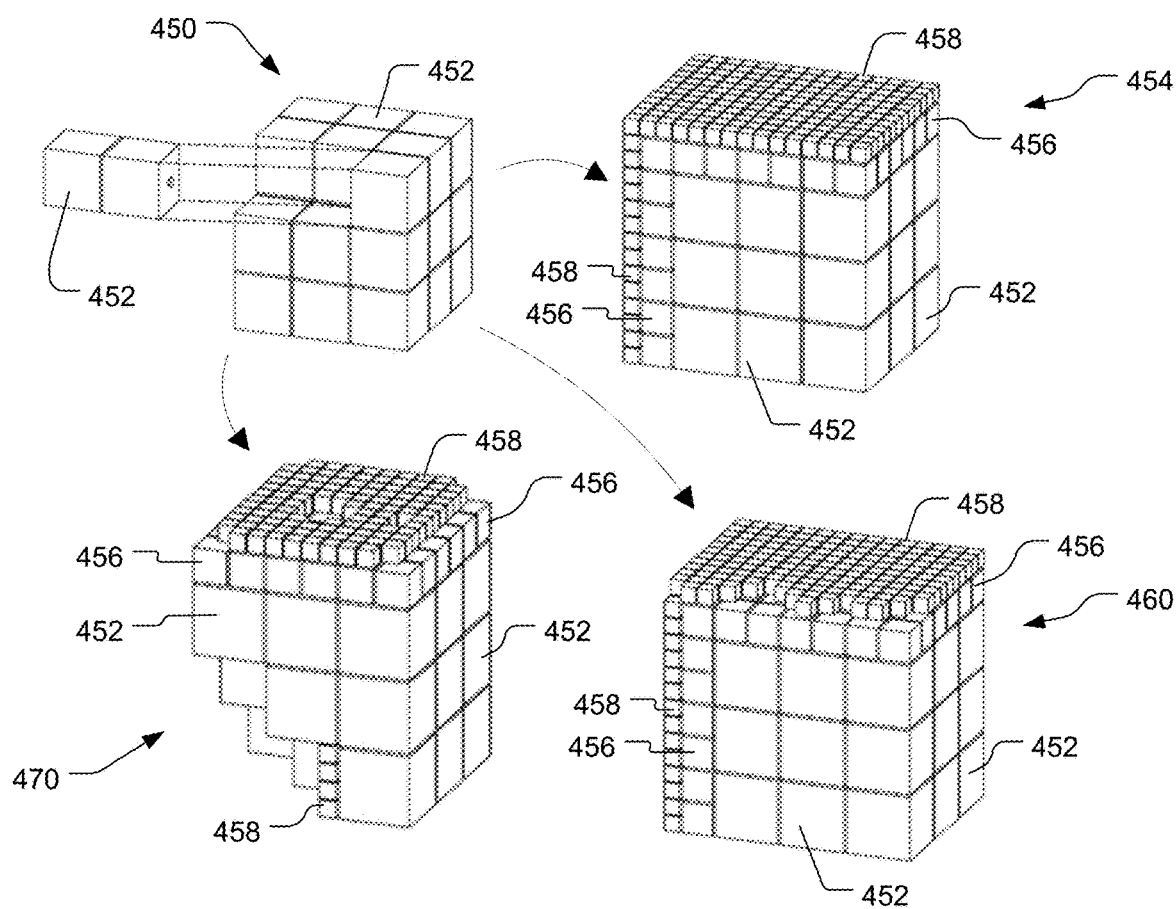
FIG. 4C is an illustration of forming of a core structure with differently sized preforms according to some embodiments.

Turning to FIGS. 4A-4C, three different core structures are depicted, each illustrating a possible variation that can be extended to other embodiments. FIG. 4A, for example, illustrates a core structure 400 formed from a single layer 402 of preforms 404. The preforms 402 can be assembled together using tubular structures (e.g., as described with reference to FIGS. 1 and 2A-2D), using a protrusion and hole connection method (e.g., as described above with reference to FIGS. 3A-3C), or with any other suitable mechanism. In some cases, the preforms 404 may not all be physically connected together, but instead may simply be positioned in an adjacent arrangement. Among possible embodiments, the single layer 402 of the preforms 404 can be used to cast a component or container having a generally flat and planar configuration with numerous compartments and corresponding internal support structure. For example, the core structure 400 could be used to cast a wide, flat container having several compartments for storing a fluid. As another example, the core structure could be used to cast planar sheets of armor having internal compartments and reinforcing support structure that strengthens the finished component. In certain cases, the core structure 400 could be used in combination with additional preforms to form a three-dimensional core structure with various dimensions and a corresponding component.

Turning to FIG. 4B, in some cases multiple preforms of different sizes can be used to create a core structure (and casted component) having particular features and properties. FIG. 4B is a top view of a core structure 420 with an arrangement of preforms of different sizes according to an embodiment. In this embodiment a larger preform 424 is positioned in the middle of several smaller preforms 422. Protrusions 426 and cooperating recesses (not shown) couple the smaller preforms 422 together and also connect the small preforms 422 to the larger preform 424.

Casting a structural component and/or container with the core structure 420 according to the methods described herein can thus produce a casted component with a large central compartment corresponding to the large preform 424 and several smaller compartments corresponding to the smaller preforms 422. This arrangement of smaller and larger compartments can be useful in some cases to increase the storage volume of a container. For example, a larger, central compartment can potentially hold a higher volume of fluid without intermediate support structure occupying space within the large compartment. Although this may lead to less support structure immediately reinforcing the large compartment, the surrounding configuration of smaller compartments, with an increased network of support structure, can provide a reinforced buffer zone between the larger compartment and the exterior walls of a container. Thus, a container cast with this type of configuration of compartments can potentially store a larger volume of fluid at a higher pressure, with less change of tank rupture.

FIG. 4C is a schematic representation of multiple core structures illustrating an aspect of conformability provided by certain embodiments described herein. As is shown, a basic core structure 450 can be formed by connecting multiple preforms 452 of the same size using the protrusion/recess coupling method described above (or another suitable connection method). This basic core structure 450 can then be further built upon to form other core structures with a wide variety of shapes and configurations. For example, in some cases a core structure 454 can be built with increasingly smaller preforms 456, 458 arranged in layers outward from the basic structure. In some cases this type of configuration could increase the rupture strength of a container along a particular side or surface of the container and/or may redirect escaping high velocity fluids away from those surfaces/sides. Of course numerous variations of this example are possible with each additional embodiment potentially have additional advantages depending upon the specific configuration of preforms and potential uses thereof.

Also shown in FIG. 4C is another example of a core structure 460 including preforms 452, 456, 458 of different sizes. In this example, the arrangement of outermost (and in this case, smallest) preforms 458 has been changed to provide a specific contour for the top surface 462 of the core structure. Such changes to the exterior shape and contour of the core structure, and eventual casted component, can be accomplished by assembling preforms of various sizes as may be needed. Thus after casting, a structural component or container can be fabricated with both an enhanced internal structure that strengthens the component or container (e.g., from bursting outward, being crushed inward, etc.) and an outer surface that can potentially be conformed to any desirable shape. Another core structure 470 shown in FIG. 4C illustrates an even greater degree of surface contouring, thus illustrating how a core structure and corresponding component/container can be tailored to fit within particular environments. Accordingly, some containers formed according to these principles could be shaped and sized to fit more easily and compactly next to other structures. As just one example, a tank for storing gasoline, diesel, and/or compressed natural gas could be formed to more easily fit within the existing mechanical structure of a vehicle while still exhibiting necessary and/or desirable strength properties.

Figure 5A:
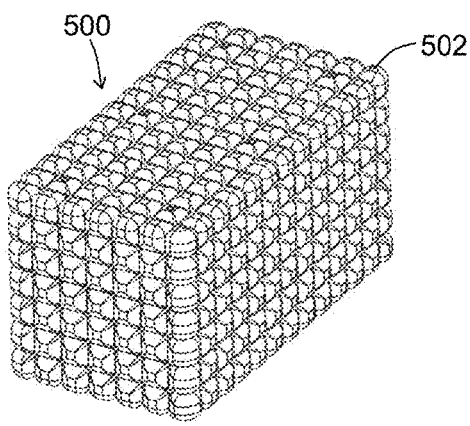
FIGS. 5A and 5B are perspective and top views, respectively, of a core structure formed from multiple arranged preforms according to some embodiments.
Figure 5B:
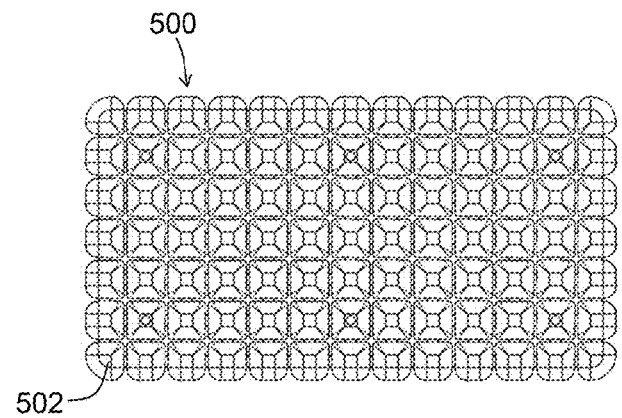
Figure 5C:
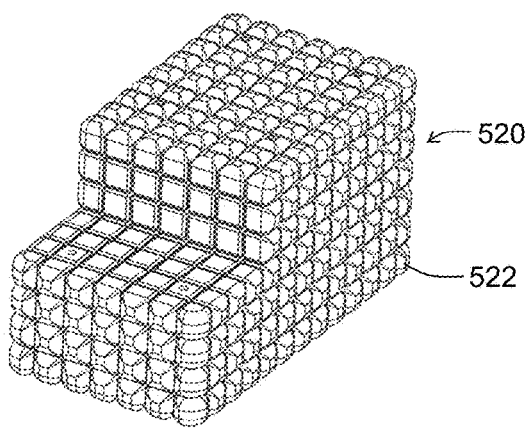
FIG. 5C is a perspective view of an asymmetrical core structure formed from multiple arranged preforms according to some embodiments.
Figure 5D:
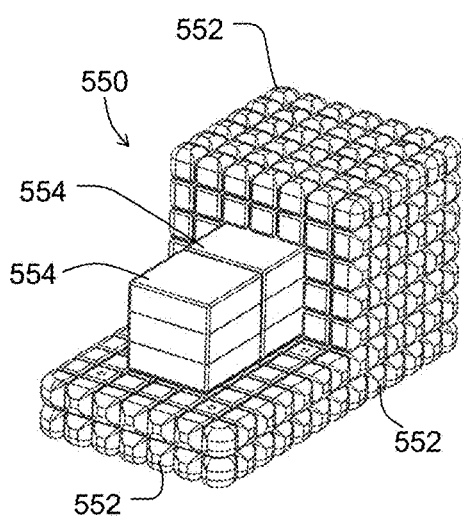
FIGS. 5D and 5E are a perspective cut-away view and a side view, respectively, of a core structure formed from preforms of different sizes according to some embodiments.
Figure 5E:
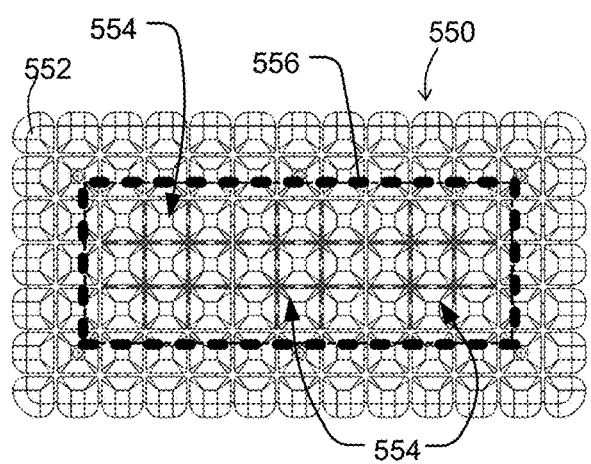

FIGS. 5A-5E illustrate additional examples of core structures according to certain embodiments of the invention. In particular, FIGS. 5A and 5B are perspective and top views, respectively, of a core structure 500 formed from multiple preforms 502 arranged in a lattice or grid-style arrangement according to some embodiments. FIG. 5C is a perspective view of an asymmetrically shaped core structure 520 formed from an arrangement of preforms 522. As can be seen, this particular core structure 520 illustrates an additional variation using the principles of conformability discussed with respect to FIG. 4C. FIGS. 5D and 5E are a perspective cut-away view and a side view, respectively, of a core structure 550 similar in some respects to the example shown in FIG. 4B. As is depicted, the core structure 550 includes preforms 552, 554 of different sizes, including three centrally located larger preforms 554, and multiple smaller preforms 552 arranged in rows two preforms wide about the larger preforms 554. FIG. 5E shows within a dotted line 556 how the larger preforms 554 can be partially seen behind the outer layers of smaller preforms 556 from a side view.

Figure 6:
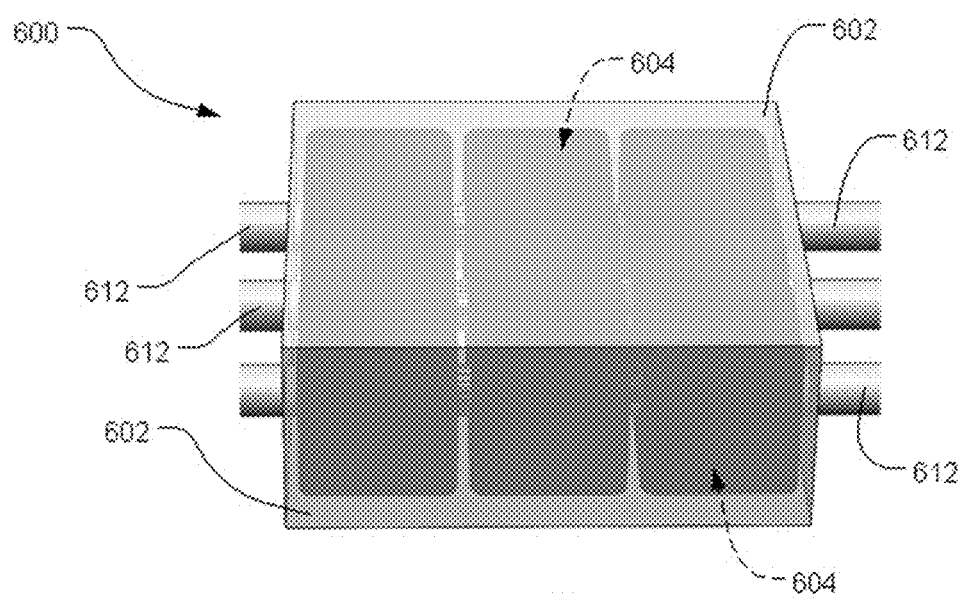
FIG. 6 is a perspective view of a casted structural component according to some embodiments.

Turning to FIG. 6, a perspective view of a casted structural component 600 is shown according to some embodiments. The structural component 600, is illustrated as a container 600 that includes a solidified molten material 602 surrounding and encapsulating a layer of compartments 604 that have been formed using a core structure similar to the structure shown in FIG. 2D. As shown in FIG. 6, the component 600 includes multiple rods 612 extending from the casted material. As discussed with respect to FIGS. 2C and 2D, the rods 612 align and connect a grid of nine preforms for the component 600. During the casting process, the preforms resist infiltration by the molten material, thus forming the compartments 604 within the solidified material 602. In some cases the preform material may then be removed, or optionally retained within the compartments 604. For example, in some cases a water or other fluid rinse could be introduced into the compartments through the rods 612 in order to dissolve and/or rinse away preforms made from salt, sand, or another similar substance. In some cases the preforms could be formed from a carbon material that is then oxidized and burned away by sufficiently heating the finished casting.

Figure 7A:
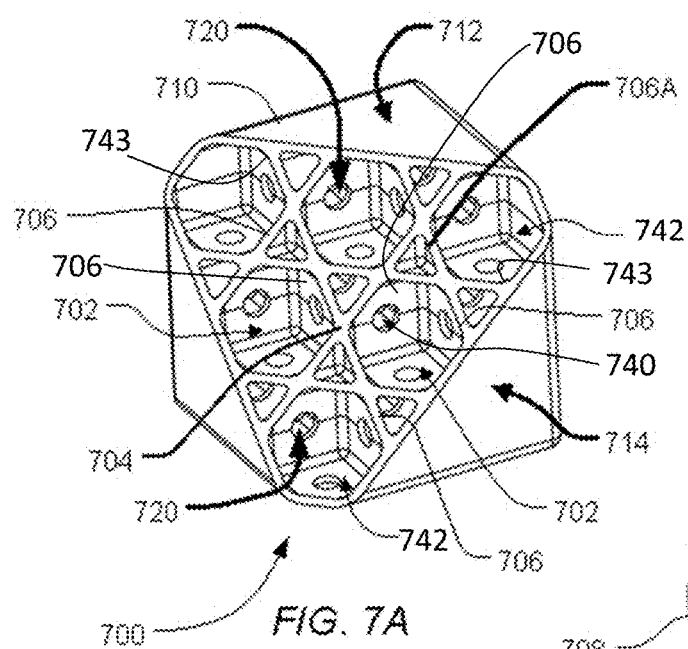
FIGS. 7A-7B are perspective sectional and cut-away views, respectively, of a casted container according to some embodiments illustrating a first set of compartments separating a second set of compartments from external walls.
Figure 7B:
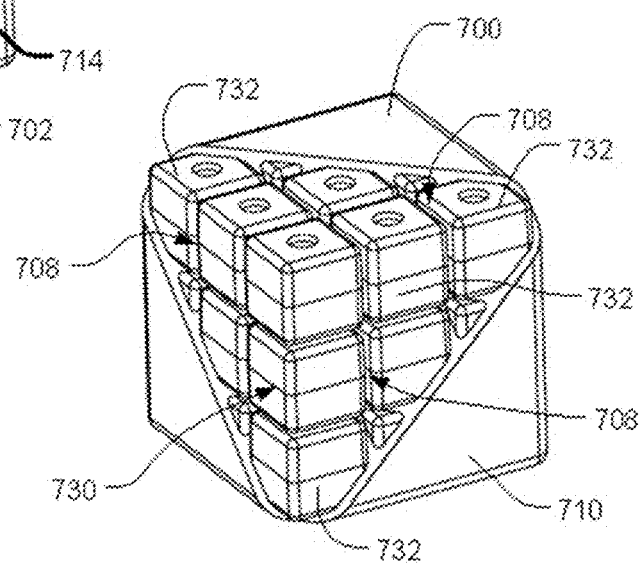

FIGS. 7A-7D illustrate two additional embodiments providing a differently shaped core structures and containers. Turning to FIGS. 7A and 7B, perspective sectional and cut-away views, respectively, of a casted container 700 and a core structure 730 are depicted. As is shown, the container 700 includes multiple compartments 702, each having the general shape of a corresponding preform 732 of the core structure 730 used to cast the container 700. The sectional view of the container 700 reveals an internal support structure 704, which in this embodiment is generally formed from multiple support members 706 that also provide corresponding internal walls separating adjacent compartments 702. As previously discussed, the internal support structure 704 can be formed, generally, by introducing a molten material into the interior and exterior flow paths 708 existing between adjacent preforms of the core structure and between the core structure and the mold cavity wall. As illustrated, in this embodiment the support members can be described as having a rectilinear configuration, in so much as each support member and/or internal wall 706 extends in a straight line. Intersections of internal walls 706 of internal support structure 704, and intersections of internal walls with external walls 710 is a solidified casted junction 743.

Continuing with reference to FIGS. 7A and 7B, the container 700 includes an external wall 710 that, although not shown in the drawings, substantially encloses the compartments 702 and internal support structure 704. As will be appreciated, the support structure 704 extends between various portions of the external wall 710 and thus strengthens the external wall 710 from both expansive and compressive forces. As an example, one rectilinear support member 706A is illustrated as extending between and connecting two outer wall portions 712, 714 of the container 700. Note that two outer wall portions in some embodiments may be continuous such as the cylindrical shaped container illustrated in FIG. 7C. Given this structural system, the structural integrity of the container is enhanced while still provided ample space within the container 700 for storing a substance. In addition, the container 700 includes a number of openings 720 in the internal walls that provide one or more internal fluid flow paths through a contiguous cavity formed by the combination of compartments 702 and openings 720.

As shown in FIGS. 7A and 7B, in some embodiments structural components, containers, preforms, and/or core structures can have outer walls and exterior surfaces that generally have a combination of approximately planar configurations. Accordingly, some embodiments can provide structural components and containers that do not have a cylindrical configuration, as is typical with high-pressure components and containers, but instead have a combination of generally flat surfaces. As previously discussed, the ability to have exterior component/container surfaces with different shapes can provide additional conformability and flexibility above and beyond typical cylindrical and/or curved configurations when designing a structural component and/or container.

Figure 7C:
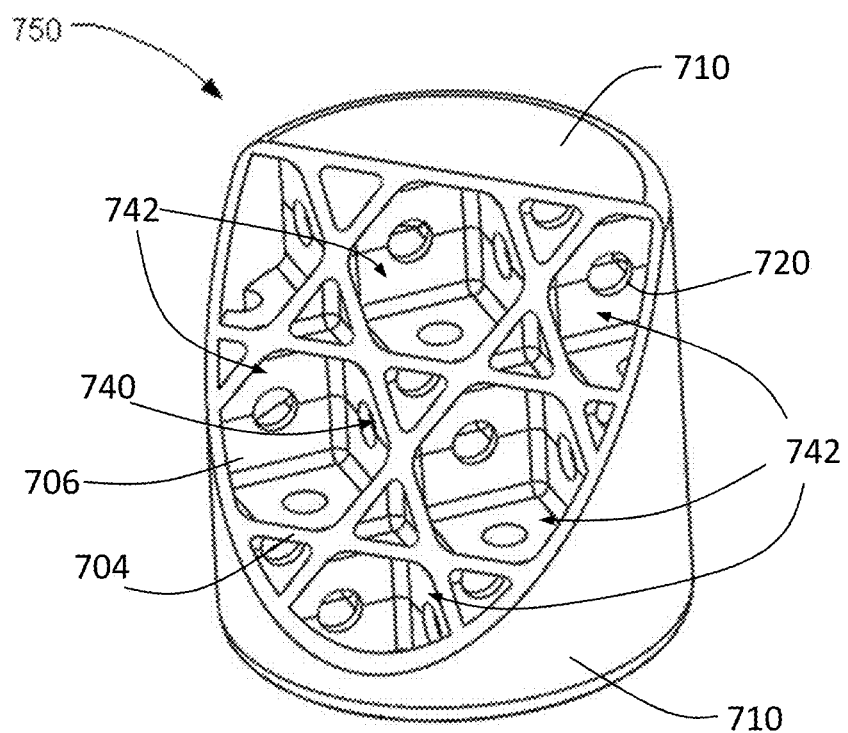
FIGS. 7C-7D are perspective sectional and cut-away views, respectively, of a casted container according to some embodiments.
Figure 7D:
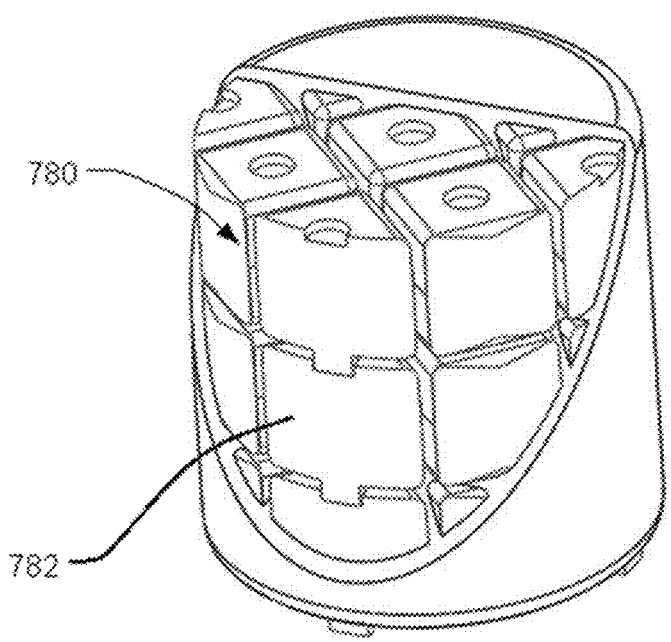

Turning to FIGS. 7C-7D, though, in certain embodiments principles discussed herein can be combined with an exterior, generally cylindrical configuration if desirable. FIGS. 7C and 7D illustrate one example of a cylindrically-shaped container 750 and a corresponding core structure 780 including a curved, exterior surface 782. The example is much the same as the examples shown in FIGS. 7A-7B, but in this case embodied within a container having a cylindrical shape. Other components of the container 750 and core structure 780 are identified in FIGS. 7A-7B.

Figure 8A:
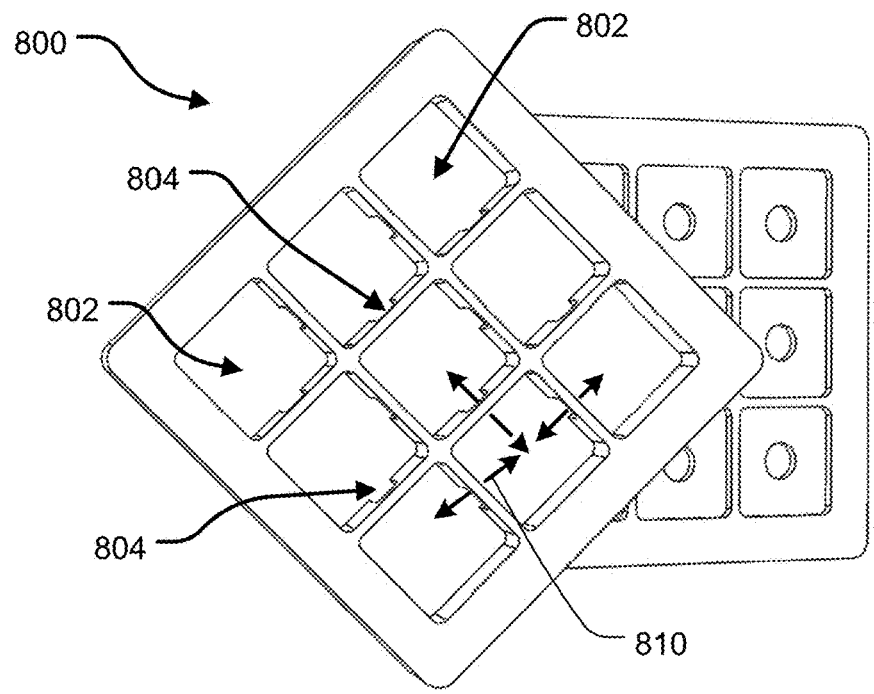
FIG. 8A provides perspective sectional views of a casted container according to some embodiments.
Figure 8B:
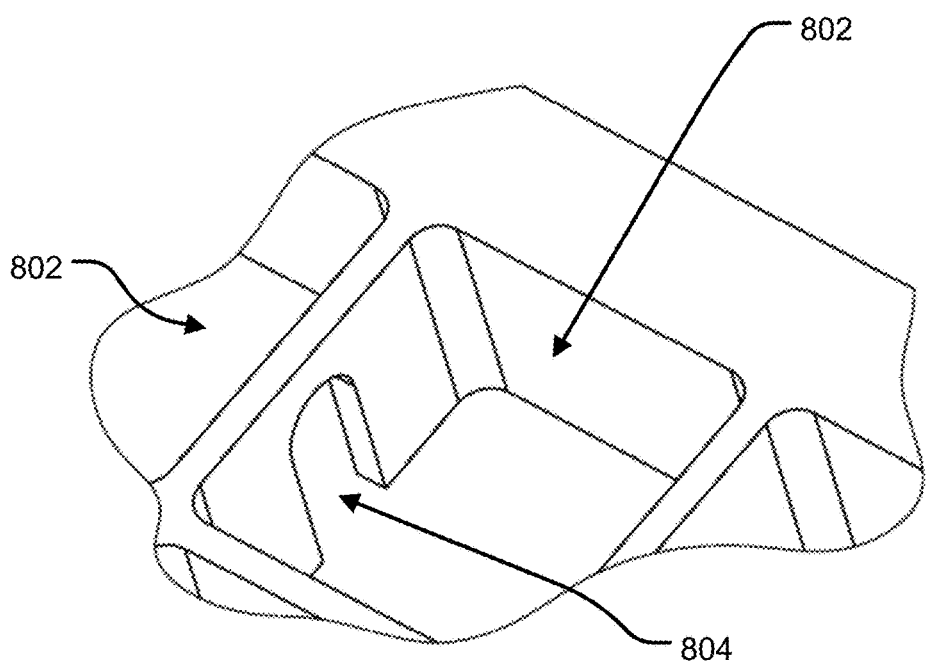
FIG. 8B is an enlarged perspective sectional view of the container of FIG. 8A according to some embodiments.

FIGS. 8A-8B provide a perspective sectional view and an enlarged perspective sectional view of a casted container 800 according to some embodiments. As can be seen, the container 800 includes multiple compartments 802 that include a number of openings 804 in the walls extending between compartments. As previously discussed, in some cases a number of openings 804 can connect multiple compartments 802, thus creating a larger, contiguous cavity within a container. In addition, the openings 804 can in some cases be strategically located in various component walls in order to create a desired fluid flow path 810 through the container's interior.

Figure 9A:
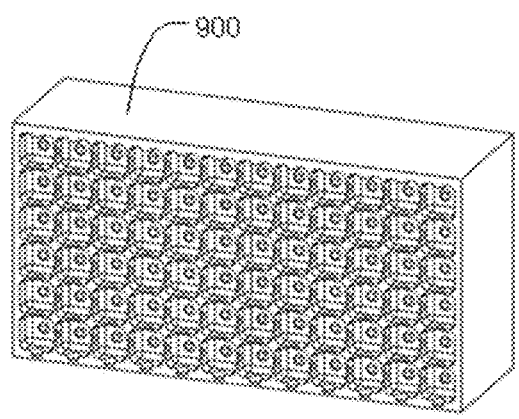
FIGS. 9A-9F are perspective and sectional or cut-away views of multiple containers according to some embodiments.
Figure 9B:
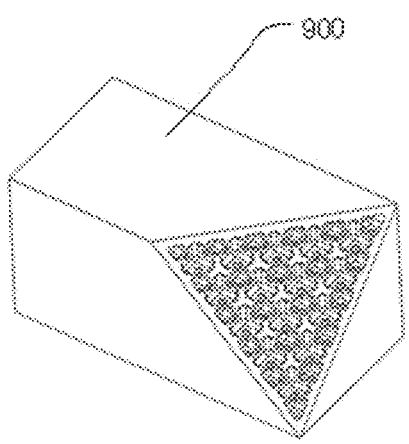
Figure 9C:
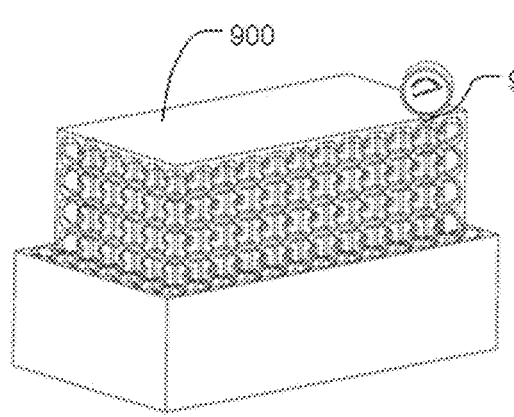
Figure 9D:
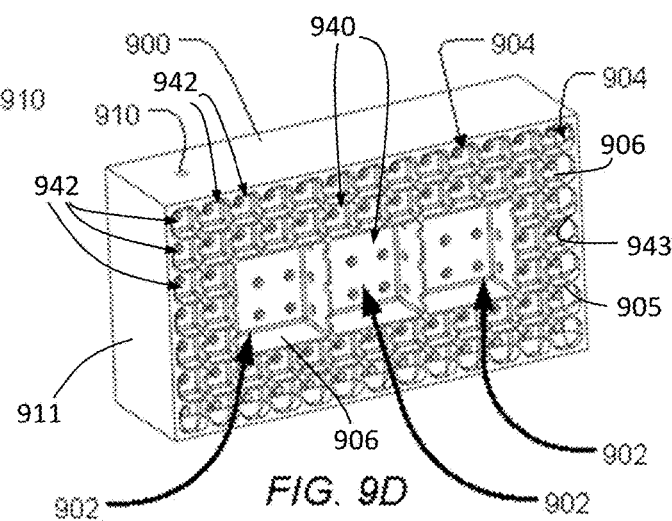
Figure 9E:
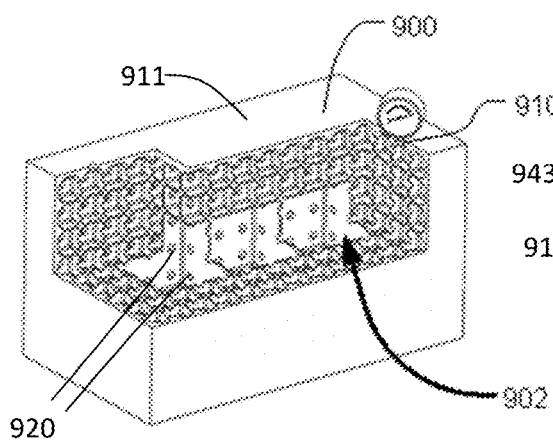
Figure 9F:
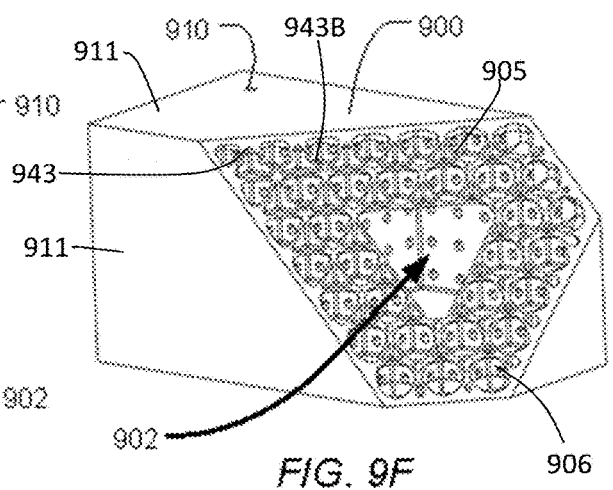

FIGS. 9A-9F are perspective and sectional or cut-away views of a container 900 according to some embodiments. As is depicted, the container 900 includes many similarities to the core structure 550 shown in FIGS. 5D and 5E. As just a few examples, the container 900 includes three large interior compartments 902 surrounded by multiple layers of smaller compartments 904, similar to what one might expect to be the resulting casting using the core structure 550 in FIGS. 5D, 5E. FIGS. 9C, 9D, 9E, and 9F also illustrate an example of a port 910 extending through the exterior surface of the container. Likewise, the casted container 700 illustrated in FIG. 7A illustrates a first set of compartments 742 each integral with external wall 710 and separating one or more second set of compartments 740 from external walls 710 of outer wall portions 712, 714. As illustrated in FIG. 7A, the second set of compartments 740 are defined entirely by the internal walls 706 of the internal support structure 704 and openings 720 connecting adjacent compartments and therefore remain spaced from external walls 710 and outer wall portions 712, 714. As further illustrated in FIG. 7C, a first set of compartments 742 each integral with external wall 710 separates one or more second set of compartments 740 from external walls 710 of the outer wall portions. Again, the second set of compartments 740 are defined entirely by the internal walls 706 of the internal support structure 704 and openings 720 connecting adjacent compartments and therefore remain spaced from external walls 710 and outer wall portions. Although the container 900 is illustrated (FIGS. 9A-9F) with interior compartments 902 larger in size compared to compartments 904, in alternative embodiments the interior compartments 902 are of equal or of smaller size than compartments 904. This is illustrated in FIG. 7C for example where the compartments are similar sized. Also, the casted container 900 illustrated in FIGS. 9A-9F illustrates a first set of compartments 942 each integral with external wall 911 and separating one or more second set of compartments 940 from external walls 911. As illustrated in FIG. 9D, the second set of compartments 940 are defined entirely by the internal walls 906 of the internal support structure 905 and openings 920 connecting adjacent compartments and therefore remain spaced from external walls 911. Unlike FIG. 7A which illustrates essentially a single compartment in the second set of compartments, FIG. 9D illustrates that the second set of compartments 940 may comprise a plurality of compartments of one or multiple layers and whereas the various compartments may vary in size. Also illustrated in FIG. 9D, intersections between the internal support structure 905 and external walls 911 is a solidified casted junction 943. Similarly, intersections between the various internal walls 906 of the internal support structure also comprise solidified casted junctions 943B.

Figure 10A:
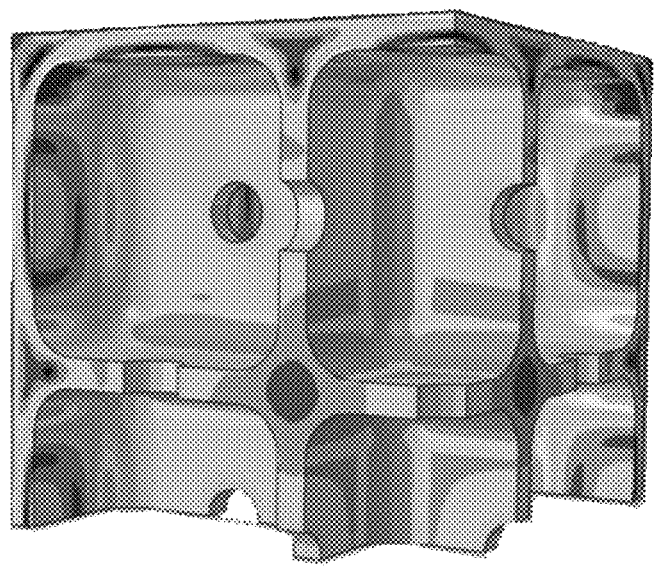
FIGS. 10A-10C are perspective illustrations of different containers showing relative stress loads according to some embodiments.
Figure 10B:
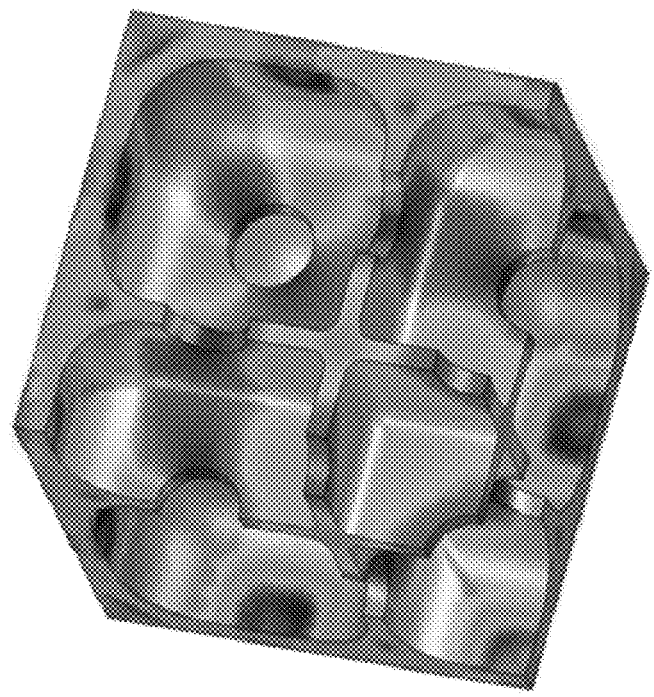
Figure 10C:
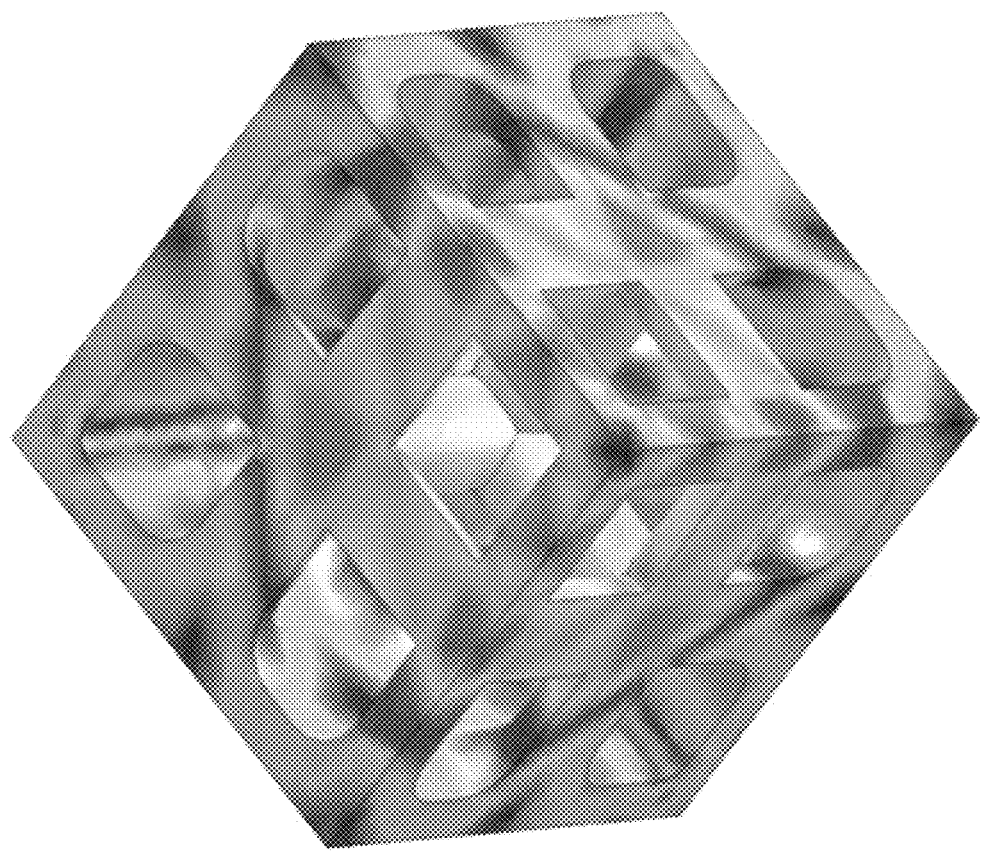

Referring to FIGS. 10A-10C, in some cases a computerized Finite Element Analysis (FEA) analysis can be used to optimize the parameters of a container. For example, in some cases one or more of the following parameters can be optimized using FEA: Inner cell size, Outer cell size, Inner wall thicknesses, Outer wall thickness, Inter-cell hole diameter, Volume of material, Volume of enclosed space, Ratio of volume of space to material, Minimize weight of material, and Corner Radii. This process can be useful to minimize the stresses felt by the container walls. The views of the container 1000 shown in FIGS. 10A-10B illustrate where stress is felt by the internal and external portions of the components. For example, darker areas and patterns of the views indicate areas of potentially higher stress, but also illustrate how the stress is distributed and dispersed about the interior surfaces of the compartments.

According to some embodiments, a two-step process can be used to find an efficient model (e.g., for a multi-celled system) for a structural component and/or container. In some cases the process includes: 1) Numerical Optimization; and 2) Finite Element Analysis. According to an embodiment, using basic geometry, an explicit formula for the volume of material and the volume of contained space can be found for a container in terms of several parameters. In some cases a determination based on a Method of Steepest Ascent can start with an initial set of parameter values, calculating the gradient, which gives the direction that increases the greatest. This method can be used to find a series of parameter values that result in an ever-increasing value, giving precedence to parameters that have the greatest influence.

EXAMPLE

Using FEM, the stress of each model is calculated. FEM models were created on Abaqus 6.9 using a Python script. The following properties of Aluminum 7075 were used:
 10E6 psi Young's modulus
 0.33 Poisson's ratio
 68 ksi yield strength
 0.102 lb/in$^3$ density Boundary conditions were used for symmetry, thus representing an entire 3×3×3-celled model. Uniform pressure of 3600 psi was applied to all inner surfaces of the model shown in FIGS. 10A-10C. The analysis used quadratic hexahedral and wedge elements, C3D20R and C3D15, with a Seed size: 0.03 in.
Exemplary Model Details:
 Cell size: 1.033 in
 Fillet radius: 0.168 in
 Inter-cell hole radius: 0.112 in
 Outer wall thickness: 0.102 in
 Inner wall thickness: 0.106 in
 Volume of material: 15.30 in$^3$
 Volume of enclosed space: 28.13 in$^3$
 Weight of material: 1.56 lb
 Ratio of volume of space to material: 1.86
 This is a 6% increase compared to previous models
 Max Mises stress is about 68 ksi
Example of Steps that can be Followed in an Exemplary Analysis:
 Develop a Python script to generate models with varying cell sizes (such as the model shown) and run an optimization algorithm to refine models and cell structure
 Consider alternative methods of optimization that better incorporate FEM results
 Internal structure can have larger cell size than external cells. Utilize an FRG optimization of the open area.

Referring to FIGS. 11A-11D, a method of casting preforms is illustrated. The figures show a core and cavity configuration wherein the core side of the mold creates voids in the preforms and the cavity side of the mold creates the outer preform boundary. As is further shown, the core set is inserted into the mold body and as a final step, the preforms are ejected.

Figures 11A, 11B:
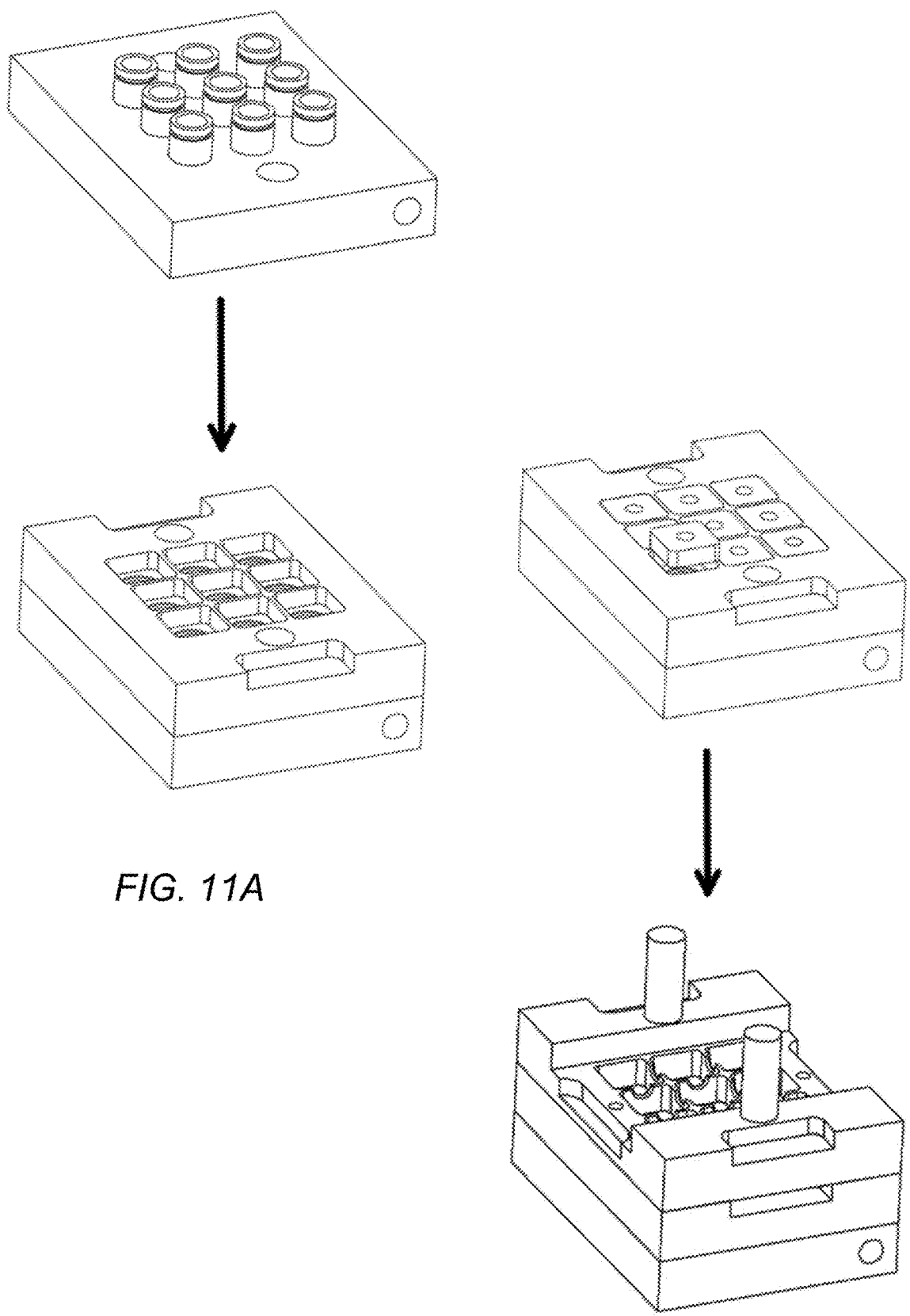
FIGS. 11A-11D illustrate steps in a method of casting preforms according to some embodiments.
Figure 11C:
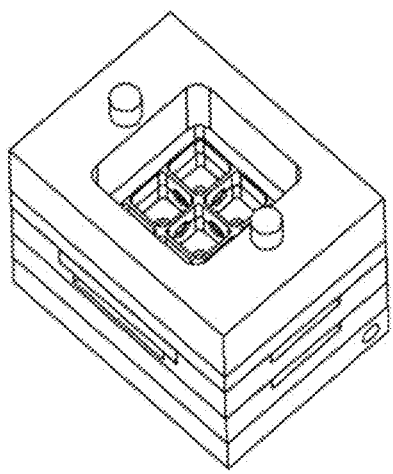
Figure 11C:
Figure 11C:
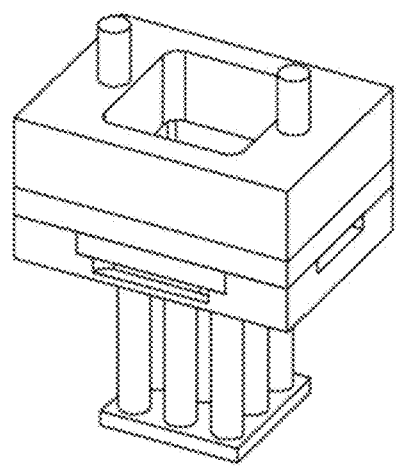
Figure 11D:
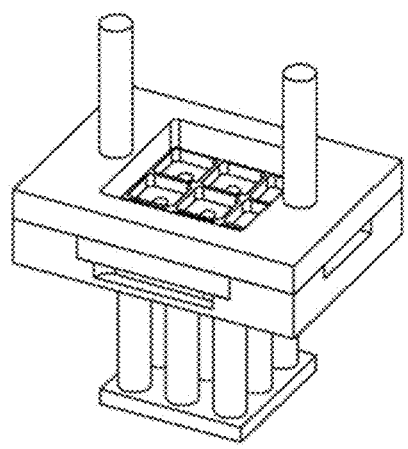
Figure 11D:
Figure 11D:
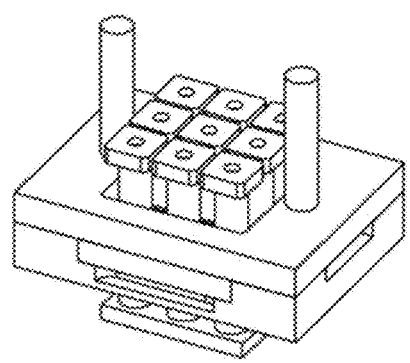

FIG. 11A illustrates a mold cavity for forming preforms that is about to receive from above an injection guide with sprue for injecting the preform material into the mold cavities. FIG. 11B illustrates on top the preforms cast within the mold cavities and on bottom, the mold cavity configuration with cores in place. FIGS. 11C and 11D illustrate the action of an ejector pin system for ejecting the preforms.

When casting a structural component and/or container, a molten material is introduced about a core structure or casting insert within the mold cavity. According to some embodiments, containers and other structural components can be cast from a molten material that includes one or more of a metal, a metal matrix composite, glass, an elastomer, a confection, a thermoplastic polymer, a thermosetting polymer, or any combinations thereof. The molten material can be introduced by one or more of the several methods known in the art of casting, which methods include but are not limited to injection molding, die casting, squeeze molding, squeeze casting, gravity casting, or any other technique(a) as may become apparent to one skilled in the art. In some embodiments, an adequate amount of pressure can be applied to the molten material so as to break apart at least a portion of the barrier layer under pressure.

Figure 12A:
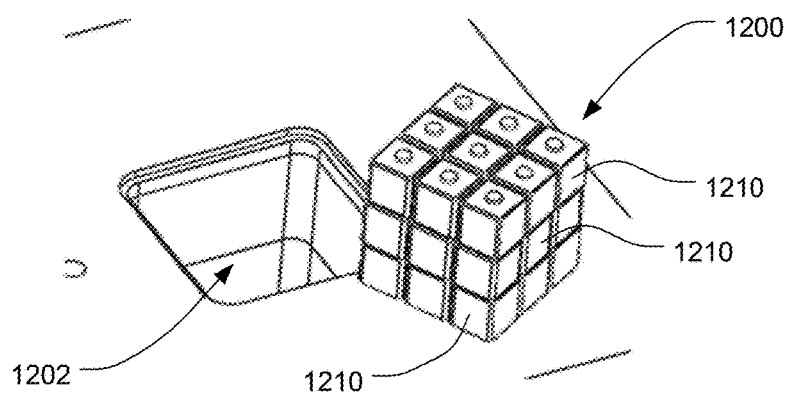
FIGS. 12A-12F illustrate steps in a method of casting a container with a core structure according to some embodiments.
Figure 12B:
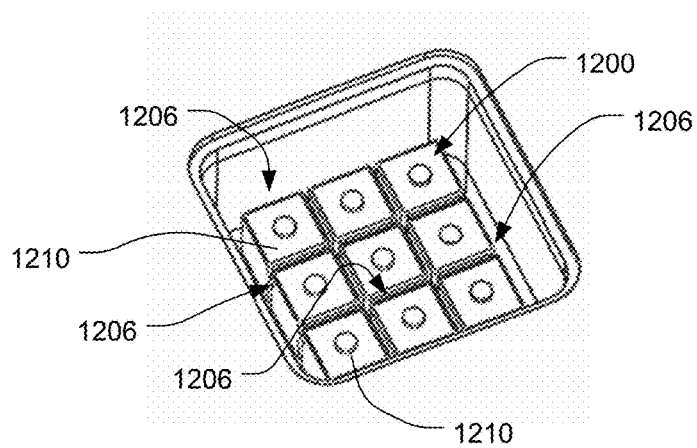
Figure 12C:
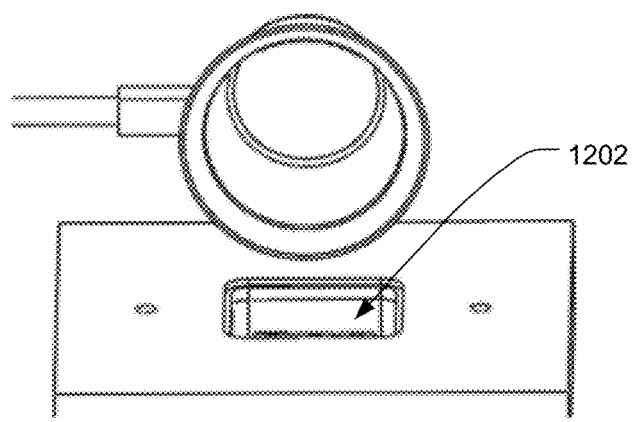
Figure 12D:
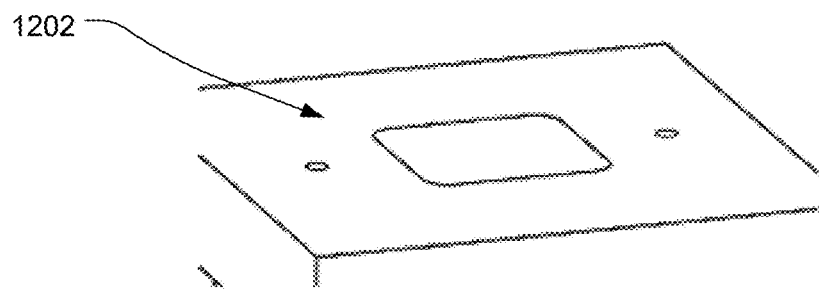
Figure 12E:
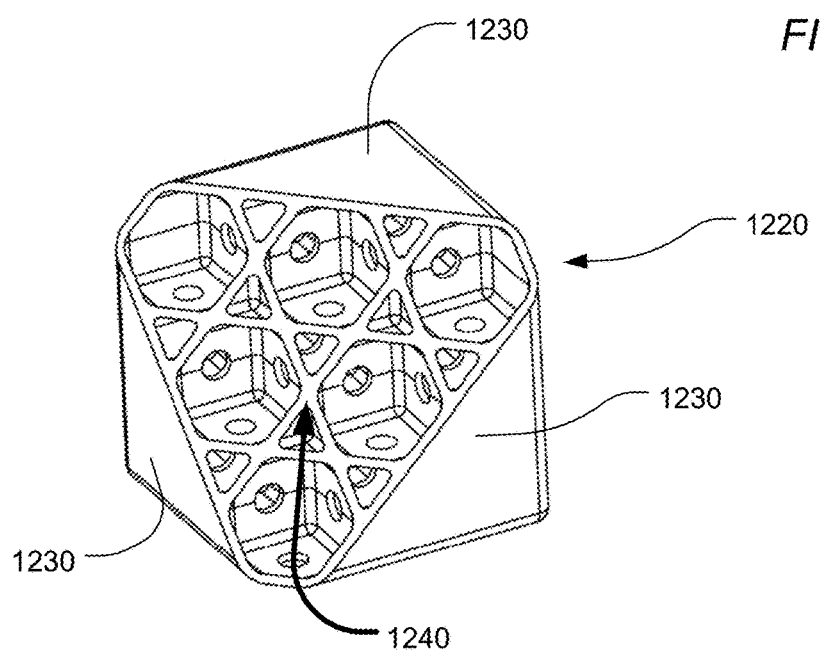
Figure 12F:
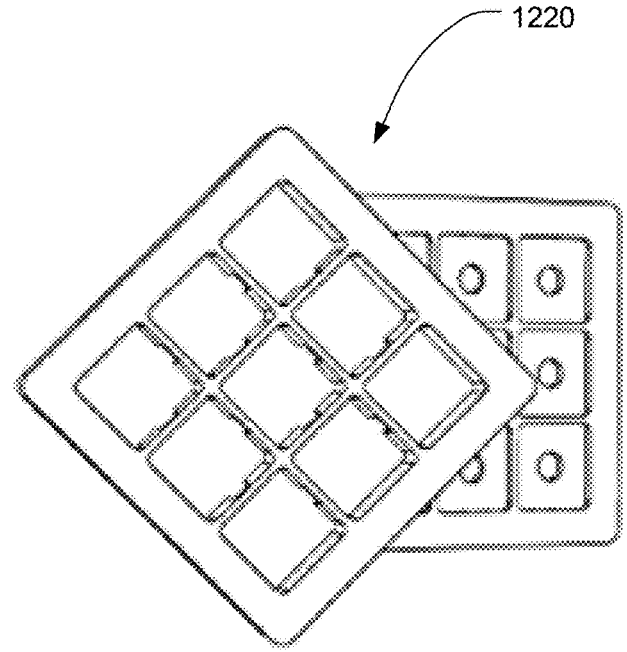

Referring to FIG. 12A-12F, a method for casting a structural component and/or container is illustrated. In accordance with an embodiment, the method includes positioning a core structure or casting insert 1200 within a mold cavity 1202 as illustrated in FIGS. 12A and 12B. As previously described, the core structure 1200 includes one or more preforms 1210 having a barrier layer on the external surfaces thereof and one or more flow paths 1206 between adjacent preforms 1210. Next, the molten material is introduced 1204 into the mold cavity 1202 about the entirety of the core structure. Accordingly, the molten material flows into each interior and exterior flow path 1206 illustrated in FIG. 12B. As previously described, one or more of several methods known in the art can be used for introducing the molten material about insert 1200. Also as previously described, a barrier layer about preforms 1210 forming the core structure 1200 can prevent the molten material from infiltrating the preforms 1210. The molten material within the flow paths 1206 and about insert 1200 is then solidified so as to form a container 1220 that encases the core structure 1200 and preforms 1210. Accordingly, the solidified material about the core structure 1200 defines external walls 1230 of the container 1220 as shown in FIGS. 12E and 12F. In addition, the solidified material within flow paths 1206 defines the internal support structure 1240 within the container 1220.

As discussed above, in some cases positioning a casting insert within a mold cavity can involve the use of additional preforms to support and orient the casting insert within the mold cavity in a desired position. For example, one, two, or more sacrificial preforms may be placed on the bottom surface of the mold cavity with the casting insert positioned on top of the sacrificial preforms to suspend the casting insert off of the bottom surface of the mold cavity. The preform(s) may also align the casting insert with respect to the mold cavity, thus ensuring a desired end product. During the casting process, molten material may infiltrate the sacrificial preforms, thus forming an integral cast structure (e.g., possibly including the preforms) below the casting insert. Such a technique can be used, for example, to form the bottom wall of a container.

According to some embodiments, compartments are formed in a structural component and/or container by disintegrating or removing preforms from within the structural component after the molten material has solidified. In some cases the preform material can be removed either before or after the molten material has solidified. For example, in some cases the preforms can be disintegrated or removed before the molten material is introduced into mold cavity or even before positioning the core structure in the mold cavity. Removing the preforms at this time, in this manner, can leave behind the solidified barrier layer that maintains the general shape of the now removed preforms, thus forming compartments within the mold cavity much the same as if the preforms were still present.

In some embodiments the preforms may be "burned" away by heating the casted container to a sufficiently high temperature. As just one example, in the case that preforms are made from a carbon-based material (e.g., graphite-based fiber material), the casted container and contents can be heated to 900° F. such that the preforms burn releasing oxygen and carbon dioxide, which can be vented. As mentioned above, some preforms may be made from sand or salt, in which case the preforms may be washed or shaken out, respectively. Sand and/or salt preforms may be useful in casting containers and other articles in which the casting is thinner, such as a structural backer for armor.

According to certain embodiments, various containers formed according to methods described herein can be used for storing pressurized gas, i.e., for storing gas at a pressure substantially greater than the atmospheric pressure. In some embodiments, compressed natural gas can be stored within preforms and/or within compartments of a container at an elevated pressure. In other embodiments, preforms and/or compartments can be used for storing one or more of a fire suppression material, an energy absorbing gel, a polymer, a liquid, a powder, a foam, or any combinations thereof.

Thus, embodiments of the invention are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention and the scope of the appended claims.

The invention claimed is:

1. A structural component cast from a molten material, the structural component comprising:
   an external wall;
   a cast first outer wall portion of the external wall;
   a cast second outer wall portion of the external wall;
   a cast third outer wall portion of the external wall having a generally planar configuration;
   a cast internal support structure extending between the first outer wall portion and the second outer wall portion; and
   a plurality of compartments positioned within the internal support structure;
   the external wall substantially enclosing the plurality of compartments;
   the internal support structure comprising a plurality of internal walls;
   said plurality of compartments comprising a first set of compartments and a second set of compartments;
   said first set of compartments separating said second set of compartments from said external walls;
   at least one of said second set of compartments defined by internal walls of the internal wall structure and openings on the internal walls connecting adjacent compartments;
   at least one of said openings extending between said first set of compartments and said second set of compartments;
   wherein the internal support structure comprises a plurality of rectilinear support members, each of the rectilinear support members comprising a solidified material formed by a corresponding molten material flow path provided by a core structure used to cast the structural component;
   wherein said rectilinear support members and said external wall are integrally formed and include a solidified material;
   wherein at least one of the rectilinear support members extends parallel to the third outer wall portion and is connected between the first outer wall portion and the second outer wall portion to enhance a structural integrity of the structural component;
   wherein the rectilinear support members comprise a plurality of internal walls defined by the compartments; and
   wherein the cast internal support structure and the cast first, second, and third outer wall portions are integral and comprise a solidified material.

2. The structural component of claim 1, further comprising at least a first contiguous cavity within the structural component, wherein the first contiguous cavity comprises two or more of the compartments.

3. The structural component of claim 2, wherein the internal walls further provide at least one fluid flow path within the first contiguous cavity through the two or more compartments.

4. The structural component of claim 1, wherein the compartments are arranged in a geometric configuration.

5. The structural component of claim 4, wherein the compartments have an approximately polyhedral shape.

6. The structural component of claim 4, wherein a first set of the compartments has a first size and a second set of the compartments has a second size larger than the first.

7. The structural component of claim 6, wherein the second set of compartments are positioned near a middle of the structural component and the first set of compartments are arranged between the second set of compartments and an external wall of the structural component.

8. The structural component of claim 7, wherein the first outer wall portion and the second outer wall portion each have a generally planar configuration.

9. The structural component of claim 1, wherein at least one rectilinear support member is configured as a generally planar wall extending parallel to an approximately polyhedral surface defining one side of a compartment.

10. The structural component of claim 1, further comprising an external wall comprising the first outer wall portion and the second outer wall portion, wherein each of the first and the second outer wall portions have a curved profile.

11. The structural component of claim 1, further comprising an external wall comprising a plurality of outer wall portions including the first, second, and third outer wall portions, wherein each of the outer wall portions has a generally planar configuration.

12. A container cast from a molten material, the container comprising:
   a plurality of compartments, each compartment having a configuration provided at least in part by a corresponding preform forming a part of a core structure used to cast the container;
   a cast internal support structure comprising a plurality of cast rectilinear support members, the rectilinear support members comprising a plurality of internal walls defined by the plurality of compartments; and a cast external wall substantially enclosing the internal support structure and the plurality of compartments;

said plurality of compartments comprising a first set of compartments and a second set of compartments;

said first set of compartments separating said second set of compartments from said external walls;

at least one of said second set of compartments defined by internal walls of the internal wall structure and openings on the internal walls connecting adjacent compartments;

at least one of said openings extending between said first set of compartments and said second set of compartments;

wherein the external wall comprises a first outer wall portion and a second outer wall portion;

wherein at least one of the rectilinear support members is connected between the first outer wall portion and the second outer wall portion to enhance a structural integrity of the container; and wherein each intersection of the cast internal support structure with the cast external wall is integral and comprises a solidified material.

13. The container of claim 12, wherein the external wall has a generally planar configuration.

14. The container of claim 12, wherein the external wall has a cylindrical configuration.

15. The container of claim 12, wherein the solidified material comprises one or more of a metal, a metal matrix composite, a glass, an elastomer, a confection, a thermoplastic polymer, and a thermosetting polymer.

16. The container of claim 12, wherein each of the plurality of compartments comprises a void formed in the container from removing one of the preforms from the core structure.

17. The container of claim 12, wherein each of the plurality of compartments comprises at least a portion of its corresponding preform, the corresponding preform comprising a permeable storage material configured to store a fluid.

18. The container of claim 17, wherein the storage material comprises a graphite based fiber material configured to adsorb the fluid.

19. The container of claim 12, wherein the external wall comprises a third outer wall portion having a generally planar configuration, and wherein the at least one rectilinear support member connected between the first outer wall portion and the second outer wall portion extends parallel to the third outer wall portion.

20. The container of claim 13, wherein the external wall comprises a plurality of outer wall portions comprising the first outer wall portion and the second outer wall portion, and wherein each of the outer wall portions has a generally planar configuration.

* * * * *